(12) United States Patent
Hashimoto et al.

(10) Patent No.: US 12,154,330 B2
(45) Date of Patent: Nov. 26, 2024

(54) SPACE RECOGNITION SYSTEM, SPACE RECOGNITION METHOD AND INFORMATION TERMINAL

(71) Applicant: MAXELL, LTD., Kyoto (JP)

(72) Inventors: Yasunobu Hashimoto, Kyoto (JP); Hitoshi Akiyama, Kyoto (JP); Naohisa Takamizawa, Kyoto (JP)

(73) Assignee: MAXELL, LTD., Kyoto (JP)

( * ) Notice: Subject to any disclaimer, the term of this patent is extended or adjusted under 35 U.S.C. 154(b) by 169 days.

(21) Appl. No.: 17/790,515

(22) PCT Filed: Jan. 9, 2020

(86) PCT No.: PCT/JP2020/000521
§ 371 (c)(1),
(2) Date: Jul. 1, 2022

(87) PCT Pub. No.: WO2021/140631
PCT Pub. Date: Jul. 15, 2021

(65) Prior Publication Data
US 2023/0035962 A1     Feb. 2, 2023

(51) Int. Cl.
*G06V 20/20*     (2022.01)

(52) U.S. Cl.
CPC ................... *G06V 20/20* (2022.01)

(58) Field of Classification Search
None
See application file for complete search history.

(56) References Cited

U.S. PATENT DOCUMENTS

| | | | |
|---|---|---|---|
| 2011/0224902 A1 | 9/2011 | Oi et al. | |
| 2011/0248995 A1* | 10/2011 | Vaughan | G06V 30/1823 345/420 |
| 2012/0249741 A1* | 10/2012 | Maciocci | G06T 19/006 348/51 |
| 2012/0327116 A1 | 12/2012 | Liu et al. | |

(Continued)

FOREIGN PATENT DOCUMENTS

| | | |
|---|---|---|
| JP | 2003-281504 A | 10/2003 |
| JP | 2011-186808 A | 9/2011 |

(Continued)

OTHER PUBLICATIONS

International Search Report of PCT/JP2020/000521 dated Mar. 31, 2020.

*Primary Examiner* — Jason A Pringle-Parker
(74) *Attorney, Agent, or Firm* — Mattingly & Malur, PC

(57) ABSTRACT

The space recognition system includes: an information terminal of a user having a function of displaying an image on a display surface and having a terminal coordinate system WA; and a label which is provided to correspond to a space and in which information for identifying the space is described. When recognizing the space, the information terminal specifies space data in which the space and the label are described in a space coordinate system W1 by using the information read from recognition of the label, measures relations in a position and a direction between the information terminal and the label by using the space data, and adapts the terminal coordinate system WA to the space coordinate system W1, based on data representing the measured relations.

42 Claims, 19 Drawing Sheets

(56) References Cited

U.S. PATENT DOCUMENTS

| | | | |
|---|---|---|---|
| 2015/0012426 A1* | 1/2015 | Purves | G02B 27/017 |
| | | | 705/41 |
| 2015/0269760 A1 | 9/2015 | Murakami et al. | |
| 2015/0379777 A1 | 12/2015 | Sasaki | |
| 2016/0180602 A1* | 6/2016 | Fuchs | G06F 3/012 |
| | | | 463/31 |
| 2019/0025595 A1 | 1/2019 | Fukuda et al. | |
| 2019/0236842 A1* | 8/2019 | Bennett | G06Q 10/10 |
| 2019/0294841 A1* | 9/2019 | Hall | G06Q 10/08 |
| 2019/0318301 A1* | 10/2019 | Zhu | G06K 7/1413 |
| 2019/0318503 A1 | 10/2019 | Hama | |
| 2019/0340819 A1* | 11/2019 | Chandrashekarappa | |
| | | | G06F 9/451 |
| 2019/0347856 A1* | 11/2019 | Huang | G06K 7/1417 |
| 2021/0303748 A1* | 9/2021 | Malekian | G06F 30/12 |

FOREIGN PATENT DOCUMENTS

| | | |
|---|---|---|
| JP | 2014-526157 A | 10/2014 |
| JP | 2015-176516 A | 10/2015 |
| JP | 2019-153274 A | 9/2019 |
| WO | 2011/118282 A1 | 9/2011 |
| WO | 2014/136700 A1 | 9/2014 |
| WO | 2017/122367 A1 | 7/2017 |
| WO | 2018/123022 A1 | 7/2018 |

* cited by examiner

FIG. 16

| SPACE COORDINATE SYSTEM | TERMINAL COORDINATE SYSTEM | ROTATION | REPRESENTATION OF ORIGIN |
|---|---|---|---|
| 1 | A | $q_{A1}$ | $O_{1A}$ |
| 2 | A | $q_{A2}$ | $O_{2A}$ |
| 3 | A | $q_{A3}$ | $O_{3A}$ |
| 4 | A | $q_{A4}$ | $O_{4A}$ |

FIG. 17

| SPACE COORDINATE SYSTEM | TERMINAL COORDINATE SYSTEM | ROTATION | REPRESENTATION OF ORIGIN |
|---|---|---|---|
| 1 | A | $q_{A1}$ | $O_{1A}$ |
| 2 | B | $q_{B2}$ | $O_{2B}$ |
| 3 | C | $q_{C3}$ | $O_{3C}$ |
| 4 | D | $q_{D4}$ | $O_{4D}$ |

FIG. 18

| ADJOINING SPACE COORDINATE SYSTEM | ROTATION | REPRESENTATION OF ORIGIN |
|---|---|---|
| 1,2 | $q_{21}$ | $o_{12}$ |
| 2,3 | $q_{32}$ | $o_{23}$ |
| 3,4 | $q_{34}$ | $o_{34}$ |
| 4,1 | $q_{41}$ | $o_{41}$ |

FIG. 19

| ADJOINING SPACE COORDINATE SYSTEM | ROTATION | REPRESENTATION OF ORIGIN |
|---|---|---|
| A,B | $q_{BA}$ | $o_{AB}$ |
| B,C | $q_{CB}$ | $o_{BC}$ |
| ... | ... | ... |
| ... | ... | ... |

SPACE RECOGNITION SYSTEM, SPACE RECOGNITION METHOD AND INFORMATION TERMINAL

TECHNICAL FIELD

The present invention relates to a technique of information terminals such as head mounted displays (HMDs), and it further relates to a space recognition technique using information terminals.

BACKGROUND ART

An information terminal such as an HMD or a smartphone worn or carried by a user has a function of displaying images (also described as "virtual images" or the like) corresponding to virtual reality (VR), augmented reality (AR) or the like on a display surface made to correspond to a user's view. For instance, an HMD recognizes real objects such as a wall or a desk inside a space such as a room and displays AR images to match the real objects in terms of a position or the like.

As a related-art example to the above-described information terminal, Japanese Patent Application Laid-Open Publication (Translation of PCT Application) No. 2014-526157. (Patent Document 1) is exemplified. Regarding "Classification of Total Field of View for Head-Mounted Display", the Patent Document 1 recites as follows: Based on collected sensor data and other data, the position and rotation of the head relative to the HMD wearer's body and surrounding environment may be determined. After resolving the head position, the HMD wearer's total field of view may be classified into regions. Next, virtual images may then be located in the classified regions to locate the virtual images relative to the HMD wearer's body and surrounding environment.

RELATED ART DOCUMENT

Patent Document

Patent Document 1: Japanese Patent Application Laid-Open Publication (Translation of PCT Application) No. 2014-526157

SUMMARY OF THE INVENTION

Problems to be Solved by the Invention

Conventionally, a coordinate system of an information terminal side such as an HMD and a coordinate system of a space side are generally different coordinate systems and do usually not coincide with each other. Therefore, when an HMD or the like displays a virtual image within a target space, it is difficult to display the virtual image at a suitable position or the like if these coordinate systems do not coincide with each other. In order to enable the information terminal to suitably display the virtual image within the target space if these coordinate systems do not coincide with each other, it is favorable that the information terminal measures and gets hold of a position, a distance, a shape of the real object or the like such as the wall inside the space as accurately as possible. A conventional HMD has a function of measuring the position of the real object or the like inside the space using a camera or a ranging sensor. However, it may take time for or be difficult to perform processes for the measurement.

That is to say that a problem with the related art example in view of accuracy, speed or the like arises when the information terminal displays the virtual image inside the space. The discussion on the related art example has not been sufficiently made regarding a method or the like for suitably adjusting the coordinate system of the information terminal to the coordinate system of the target space, in other words, suitably adjusting the state such as the position and the direction.

Further, the discussion on the related art example has not been sufficiently made regarding a method or the like for suitably using space data in case with such space data describing the shape of the space or the like, either. For instance, Patent Document 1 does not describe detailed methods of suitably determining positions or directions of information terminals with respect to target environments or spaces using space data nor methods of improving convenience in case of using space data.

An aim of the present invention is to provide a technique that enables an information terminal to suitably recognize and make use of the space even from a state in which the coordinate system of the information terminal side and the coordinate system of the space side do not coincide with each other as well as a technique enabling the information terminal to suitably use the space data.

Means for Solving the Problems

A typical embodiment of the present invention includes the following configuration. A space recognition system of one embodiment includes: an information terminal of a user having a function of displaying an image on a display surface and having a terminal coordinate system; and a label which is provided to correspond to a space and in which information for identifying the space is described. When recognizing the space, the information terminal specifies space data in which the space and the label are described in a space coordinate system by using the information read from recognition of the label, measures relations in a position and a direction between the information terminal and the label by using the space data, and adapts the terminal coordinate system to the space coordinate system, based on data representing the measured relations.

Effects of the Invention

According to the typical embodiment of the present invention, the information terminal can suitably recognize and make use of the space even from the state in which the coordinate system of the information terminal side and the coordinate system of the space side do not coincide with each other, and the information terminal can suitably use the space data.

BRIEF DESCRIPTIONS OF THE DRAWINGS

FIG. 16 is a view showing a configuration example (first example) of a conversion parameter in the second embodiment;

FIG. 17 is a view showing a configuration example (second example) of a conversion parameter in the second embodiment;

FIG. 18 is a view showing a configuration example (third example) of a conversion parameter in the second embodiment;

FIG. 19 is a view showing a configuration example (fourth example) of a conversion parameter in the second embodiment;

BEST MODE FOR CARRYING OUT THE INVENTION

Figure 1:
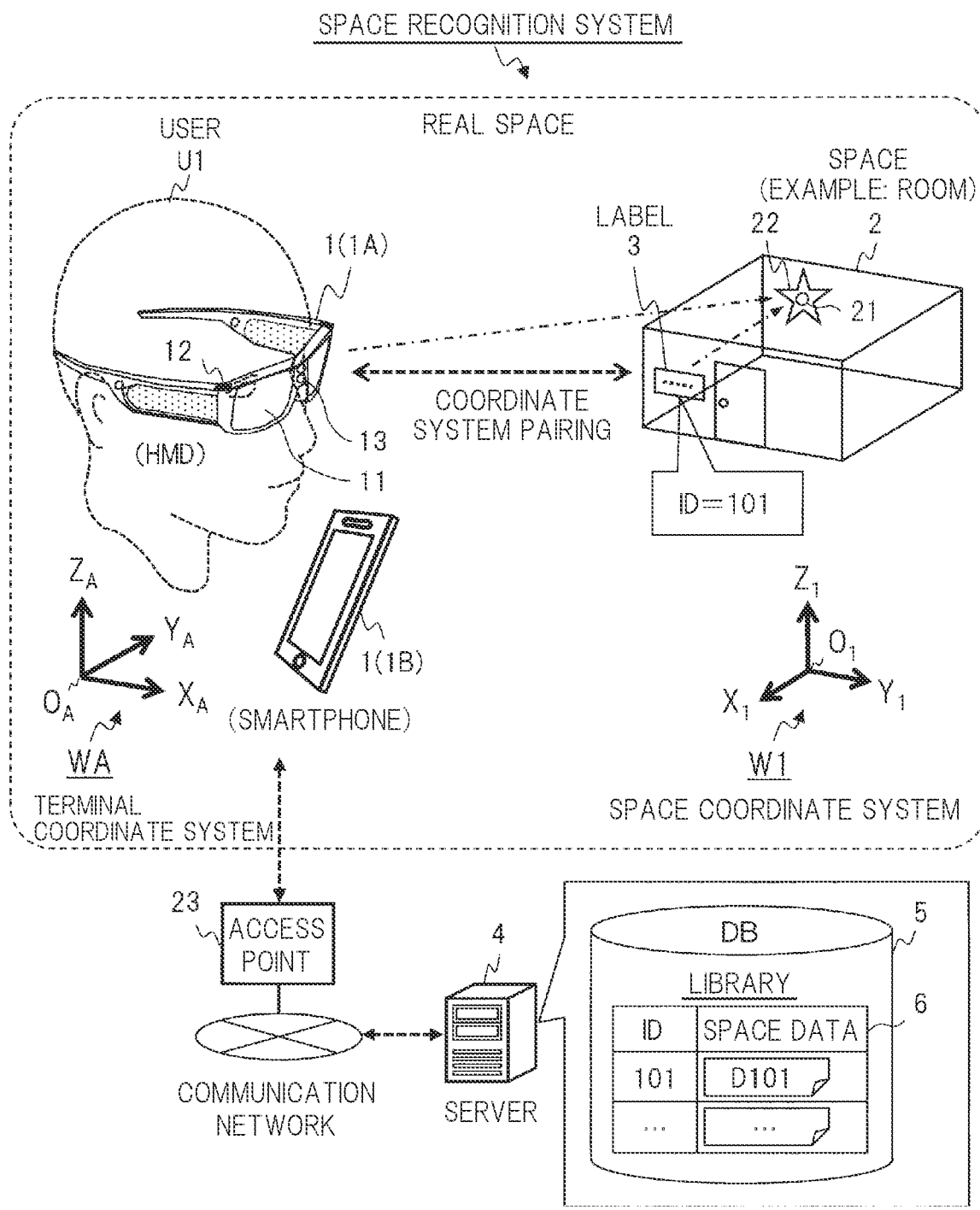
FIG. 1 is a view showing a configuration of a space recognition system according to a first embodiment of the present invention.

Hereinafter, embodiments of the present invention will be described in detail with reference to the accompanying drawings. Note that the same components are denoted by the same reference signs throughout all the drawings, and the repetitive description thereof will be omitted.

First Embodiment

A space recognition system and method of a first embodiment of the present invention will be explained with reference to FIGS. 1 to 12. In the space recognition system and method of the first embodiment shown in FIG. 1 or the like, there are cases in which an information terminal 1 holds space data 6 of a target space 2 to be used and in which the information terminal 1 acquires the space data 6 from an external source. In the latter case, the information terminal 1 acquires the space data 6 from, for instance, a server 4 as in the example shown in FIG. 1. The space data 6 is data described with the shape of the space 2 or the like. The space 2 is, for instance, a room, an area or the like inside a building. In the space 2, identification information (ID) corresponded to the space 2 and the space data 6 is preliminarily posted and displayed in form of a label 3 or the like. The space data 6 representing the ID and the shape of each space 2 or the like is preliminarily registered in the information terminal 1 or a DB 5 of the server 4 as a library. Details of the configuration and method of the space data 6 are not limited.

The information terminal 1 is an apparatus such as an HMD 1A or a smartphone 1B having a function of displaying a virtual image 22 to match at a real object position 21 inside an external space 2. The information terminal 1 has a terminal coordinate system WA as its own global coordinate system. The space 2 has a space coordinate system W1 as its global coordinate system. These coordinate systems differ from each other. The label 3 and the space 2 have a prescribed positional relationship, and positions and shapes or the like are described in the space data 6 in the same space coordinate system W1.

The space recognition system and method include a mechanism of effectively adapting the terminal coordinate system WA and the space coordinate system W1. More particularly, the information terminal 1 identifies an ID from the label 3 provided to correspond to the target space 2 to be used, and specifies the space data 6 based on the ID. After specifying the space data 6, the information terminal 1 either uses the space data 6 stored within the information terminal 1 or acquires the space data 6 from the server 4 through communication.

The information terminal 1 uses the space data 6 to perform, as coordinate system pairing as described later, an operation of adapting its own terminal coordinate system WA to the space coordinate system W1 of the target space 2. The information terminal 1 shares the position recognition with the space 2 by performing the coordinate system pairing to make the terminal coordinate system WA match the space coordinate system W1 regarding the position and the direction. After the coordinate system pairing, the information terminal 1 can accurately display the virtual image 22 of AR or the like at a desired position 21 while suitably converting the positions and the directions between these coordinate systems.

Along with the specification of the space data 6 from the label 3, the information terminal 1 measures and calculates a relation of the information terminal 1 with respect to the label 3 regarding the position or the direction for the coordinate system pairing. Accordingly, the information terminal 1 performs initial settings for the position and the direction of the information terminal 1 in the terminal coordinate system WA with respect to the space coordinate system W1 describing the space data 6. As the initial settings, the information terminal 1 can perform the adaption between the above-described coordinate systems almost simultaneously with the specification of the space data 6 from the label 3. According to the system and method, the information terminal 1 of, for instance, a user U1 can rapidly achieve the coordinate system adaption and the position recognition sharing with respect to the space 2 at the position of the label 3 such as an entrance of the room, and can provide effects such as improving user convenience. This method can rapidly perform the space recognition in comparison to the related art example in which the information terminal measures the shape of the space or the like after entering the room, and it is also possible to reduce failures and errors.

[Space Recognition System]

FIG. 1 shows a configuration of the space recognition system of the first embodiment. In this example, a case in which the target space 2 used by the information terminal 1 is one room inside the building and in which the HMD 1A is particularly used as the information terminal 1 will be explained. The space recognition system of the first embodiment has an information terminal 1 carried or worn by a user U1, and a space 2 that is to be a target used by the information terminal 1, and besides, a server 4 in which the space data 6 are registered in case of use of the server 4. The information terminal 1 is connected to a communication network such as the Internet or a mobile network through a wireless LAN access point 23 or the like. The information terminal 1 communicates with an external device such as the server 4 or the like through the communication network. Note that only one user, one information terminal 1 and one space 2 are illustrated. However, the present invention is not limited to this example, and is similarly applicable when including a plurality of information terminals of a plurality of users and a plurality of spaces.

In the HMD 1A that is the information terminal 1, a transmission type display surface 11, a camera 12 and a ranging sensor 13 or the like are included in a housing. The HMD 1A has a function of displaying the AR virtual images on the display surface 11. Similarly, the smartphone 1B includes a display surface such as a touch panel, a camera and a ranging sensor or the like, and has a function of displaying the AR virtual images on the display surface.

The space 2 is an optional space that is identified or classified to be managed to correspond to the ID and the space data 6, and is, for instance, one room. In this example, the label 3 is placed on an outer surface of the wall near the entrance of this room.

In addition to a function such as a general label enabling the user U1 to identify the space 2, the label 3 (in other words, a marker, a sign or the like) has a special function for the information terminal 1. This special function of the label 3 is a function of enabling the information terminal 1 to identify the space 2 (corresponding to the ID) to specify the space data 6 and of achieving the operation of the adaption between the coordinate systems to match the space 2.

The server 4 is a server apparatus managed by a service provider or the like, and is placed on, for instance, a data center or a cloud computing system. In the server 4, the ID and the space data 6 are registered and held in an internal or external database (DB) 5 as a library. For instance, "ID=101" is assigned to the illustrated label 3 of the space 2, and the space data 6 (D101) identified by the ID=101 is registered in the DB 5. The space data 6 is similarly registered for a plurality of respective spaces 2 and labels 3. The server 4 may manage the space data 6 closed in a unit of a company or the like or a lot of space data 6 in a unit of the earth, a region or the like. For instance, when the space data 6 is managed in a unit of a company building, respective space data 6 related to respective spaces 2 inside the building are registered in a server 4 of a computer system such as a LAN of the company or the like.

Even when the smartphone 1B is used as the information terminal 1, the substantially same functions or the like as those of the HMD 1A can be achieved. In this case, the user U1 watches the virtual images 22 of AR or the like displayed on a display surface of the handheld smartphone 1B.

[Coordinate Systems]

In the first embodiment, the coordinate systems that serve as a reference for specifying a position inside a real space or the like regarding the information terminal 1 and the space 2 (corresponding to the space data 6) are referred to as global coordinate systems. The information terminal 1 of FIG. 1 has the terminal coordinate system WA as the global coordinate system representing its own position and direction. The terminal coordinate system WA is a coordinate system for recognizing and controlling the position, the direction (in other words, a posture, a rotational state or the like) and an image display position of the information terminal 1 or the like. The space 2 has the space coordinate system W1 as the global coordinate system representing the position and the direction of the space 2. The space data 6 is described as the space coordinate system W1. The terminal coordinate system WA and the space coordinate system W1 are basically different coordinate systems. An origin and a direction of each global coordinate system are fixed within the real space (the earth, the region or the like). These coordinate systems in an initial state do not coincide with each other.

Figure 8:
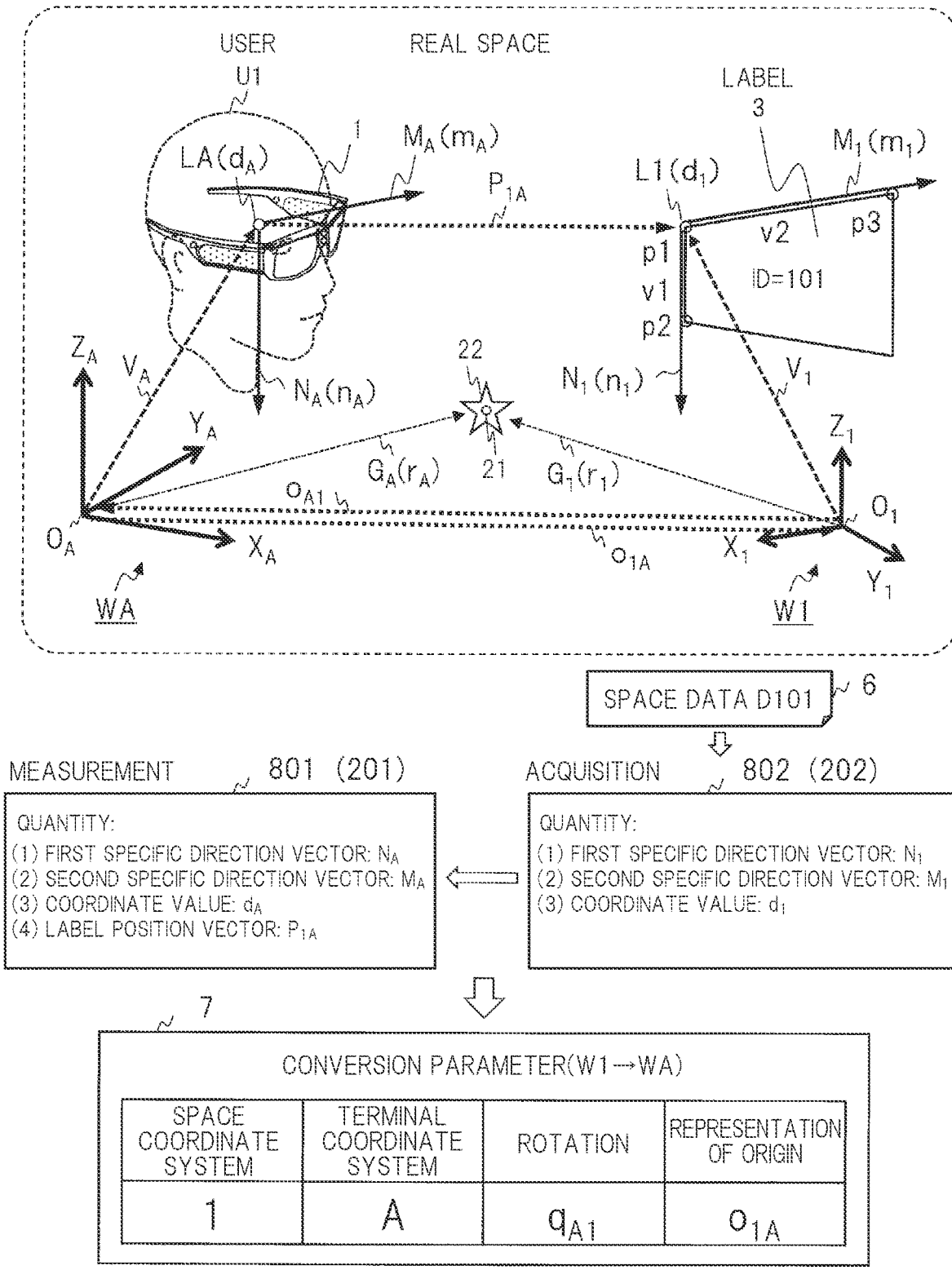
FIG. 8 is a schematic view showing a coordinate system pairing or the like in the first embodiment.

The terminal coordinate system WA has an origin $O_A$, and an axis $X_A$, an axis $Y_A$ and an axis $Z_A$ as three orthogonal axes. The space coordinate system W1 has an origin $O_1$, and an axis $X_1$, an axis $Y_1$ and an axis $Z_1$ as three orthogonal axes. The origins $O_A$ and $O_1$ are fixed at prescribed positions within a real space, respectively. A position LA of the information terminal 1 in the terminal coordinate system WA is, for instance, a preliminarily defined housing central position (FIG. 8). A position L1 of the label 3 in the space coordinate system W1 is, for instance, a position corresponding to a preliminarily-defined feature point in the label 3 (FIG. 8).

The information of the positions and shapes of the space 2 and the label 3 or the like is preliminarily described in the space data 6 using the position coordinates of the space coordinate system W1 or the like. The space coordinate system W1 may either be a specific local coordinate system for the building or the like including the space 2 or a coordinate system commonly used on the earth or in the region comprised of latitude, longitude and altitude. In this example, the space coordinate system W1 is the specific local coordinate system commonly used among a plurality of rooms or the like in the building.

The information terminal 1 performs the coordinate system pairing of its own terminal coordinate system WA with respect to the space coordinate system W1 of the target space 2. Accordingly, the information terminal 1 is enabled to perform display control of the virtual image 22 or the like to match the position and the shape in the space coordinate system W1. After the coordinate system pairing, note that the information terminal 1 is not limited to perform its own internal control based on the terminal coordinate system WA but may perform the control based on the space coordinate system W1 when being used inside the space 2.

[Space Recognition Method]

Figure 2:
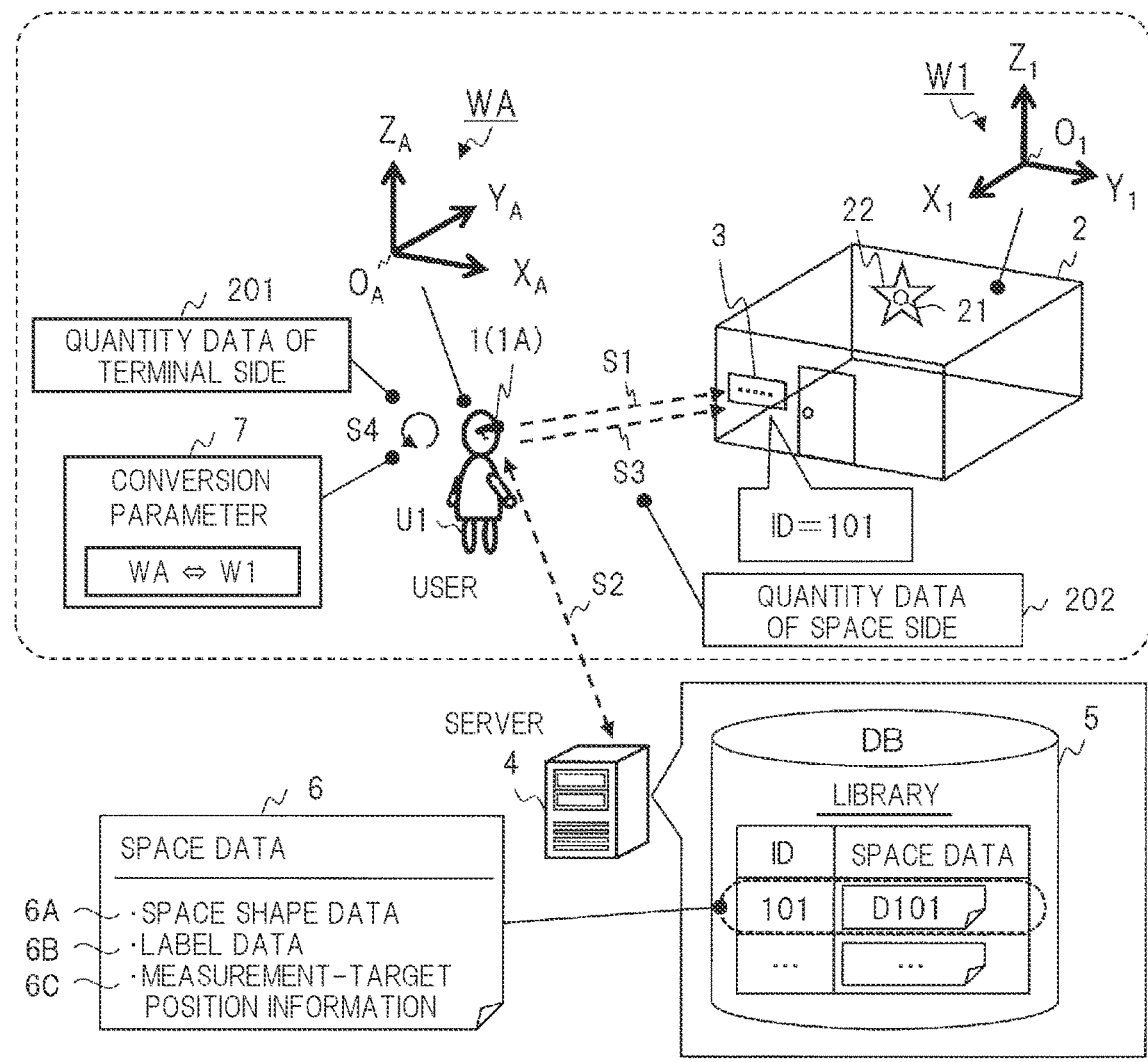
FIG. 2 is a view showing a configuration of a space recognition method according to the first embodiment of the present invention.

FIG. 2 shows an outline of a space recognition method of the first embodiment. This method includes the illustrated steps S1 to S5.

First, in Step S1, based on operations of the user U1, the HMD 1A that is the information terminal 1 captures an image of the label 3 and recognizes the label 3 by using the camera 12 at a position of the label 3 posted to correspond to the space 2 that is the target of use, and confirms and acquires the ID of the space 2 from the label 3. Accordingly, the information terminal 1 starts the coordinate system pairing for the target space 2.

Next, in Step S2, the information terminal 1 uses the ID to acquire the space data 6 (for instance, the space data D101 of ID=101) specified by the ID from the library of the DB 5 of the server 4 by the communication including the wireless communication. More particularly, the space data 6 is data including space shape data 6A, label data 6B and measurement-target position information 6C. Alternatively, the data may also be a data group in which the space data 6 corresponds to other label data 6B or the like. When the information terminal 1 already holds the space data 6, it is possible to omit the acquisition of the space data 6 from the server 4.

The space shape data 6A is data in which the position and the shape of the arrangement or the like (including the wall or the like) configuring the space 2 are described in the space coordinate system W1. The label data 6B is data in which the position and the shape or the like of the label 3 are described in the space coordinate system W1, and includes quantity data 202. The quantity data 202 is preliminarily measured and described. Quantity is a defined parameter necessary for the coordinate system pairing (more particularly, for calculation of a conversion parameter 7) (see FIG. 8 described later). The measurement-target position information 6C is defined data of a measurement-target position (such as a feature point or a feature line) or the like to be the reference used when the information terminal 1 measures the relation with the label 3. Note that these data/information formats are exemplary. For instance, a format in which the label data 6B is contained in the space shape data 6A or a format in which the measurement-target position information 6C is contained in the label data 6B may be applicable. The measurement-target position information 6C can be omitted when being preliminarily set or mounted in a program of the information terminal 1 or the like.

In Step S3, the information terminal 1 measures the relation with the label 3 regarding the position or direction based on the measurement-target position information 6C, and acquires them as the quantity data 201 of the terminal side (FIG. 8). This relation is representation of the position, direction or the like of the label 3 viewed in terms of the terminal coordinate system WA, and especially representation related to two different specifying directions within the real space. Note that the processes of Step S3 may be performed almost simultaneously with the processes of Steps S1 and S2, for instance, in a parallel manner.

In Step S4, the information terminal 1 uses the quantity data 202 of the space 2 side acquired in Step S2 and the quantity data 201 of the terminal side measured in Step S3 to generate the conversion parameter 7 for the coordinate system pairing between the terminal coordinate system WA and the space coordinate system W1, and sets the conversion parameter in its own device. Accordingly, the information terminal 1 terminates the coordinate system pairing for the space 2. Note that the information terminal 1 may preliminarily measure and hold a part of the quantity data 201 of the terminal side or measure it as needed.

Thereafter, in Step S5, the information terminal 1 of the user U1 can display the virtual image 22 at the desired position 21 inside the space 2 while suitably performing the conversion of the position or direction between the terminal coordinate system WA and the space coordinate system W1 using the conversion parameter 7. Thereafter, the information terminal 1 may either maintain the state of the coordinate system pairing state for this space 2 or expressly cancel the state. In case of maintaining the state, the conversion parameter 7 is held within the information terminal 1. In case of cancelling the state, for instance, the information terminal 1 deletes the conversion parameter 7, and generates the conversion parameter 7 again when performing the coordinate system pairing for the same space 2 thereafter. The information terminal 1 may also automatically delete the conversion parameter 7 after elapse of certain time from the coordinate pairing.

[Space]

Figure 3:
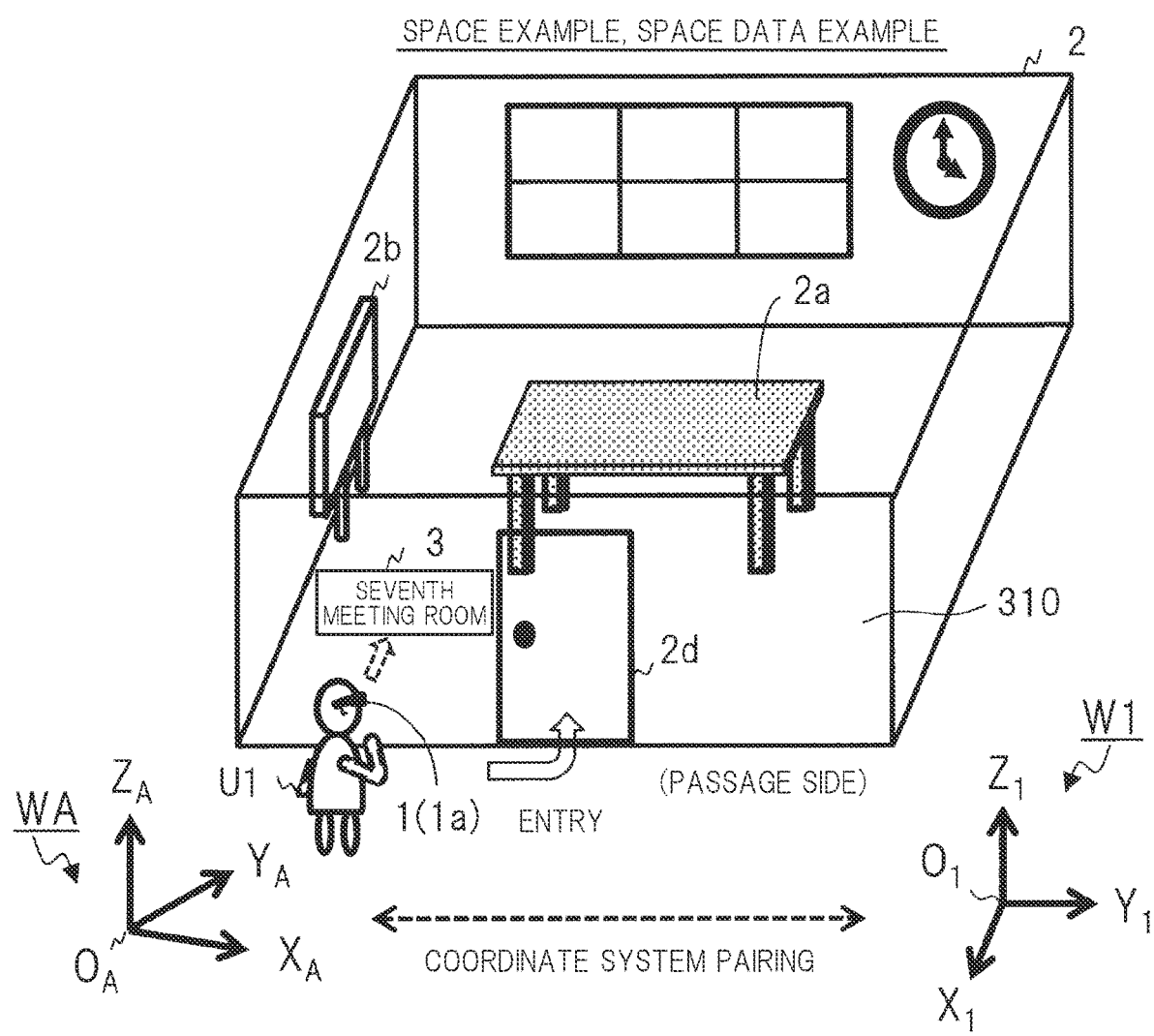
FIG. 3 is a view showing a configuration example of a space in the first embodiment.

FIG. 3 shows a configuration example of the space 2 and a positional relation example between the space 2 and the label 3. The space 2 is one room inside a building such as a company, and is, for instance, a seventh meeting room. The user U1 confirms the label 3 before he/she enters the room that is the target space 2 where the information terminal 1 is used. At this place, the user U1 looks at the label 3 through the HMD 1a that is the information terminal 1. At this time, the information terminal 1 acquires the space data 6 (for instance, the space data D101 of ID=101) corresponded to the space 2 based on the recognition of the ID from the label 3, and performs the coordinate system pairing of the terminal coordinate system WA with respect to the space coordinate system W1 of this space 2. Accordingly, the terminal coordinate system WA of the information terminal 1 is adapted to the space coordinate system W1 of this space 2. In other words, these coordinate systems are roughly regarded as a single coordinate system as a whole, and can be shared regarding the position recognition. The user U1 enters the room, and uses the HMD 1a inside this room. Using the space data 6, the HMD 1a can rapidly accurately display the AR virtual image 22 at a position 21 matched with the shape of the space 2 or the like.

The space data 6, particularly the space shape data 6A is data having an optional format representing, for instance, the position or shape of the room or the like. The space data 6 includes data representing a border of the space 2 and data of an optional object disposed inside the space 2. The data representing the border of the space 2 is data of an arrangement such as a floor, a wall, a ceiling or a door 2d configuring the room. There is also a case without the arrangement on the border. The data of the object inside the space 2 is data of, for instance, a table 2a, a whiteboard 2b or the like disposed inside the room. Note that the label 3 may also be provided on the door 2d or the like.

Figure 4:
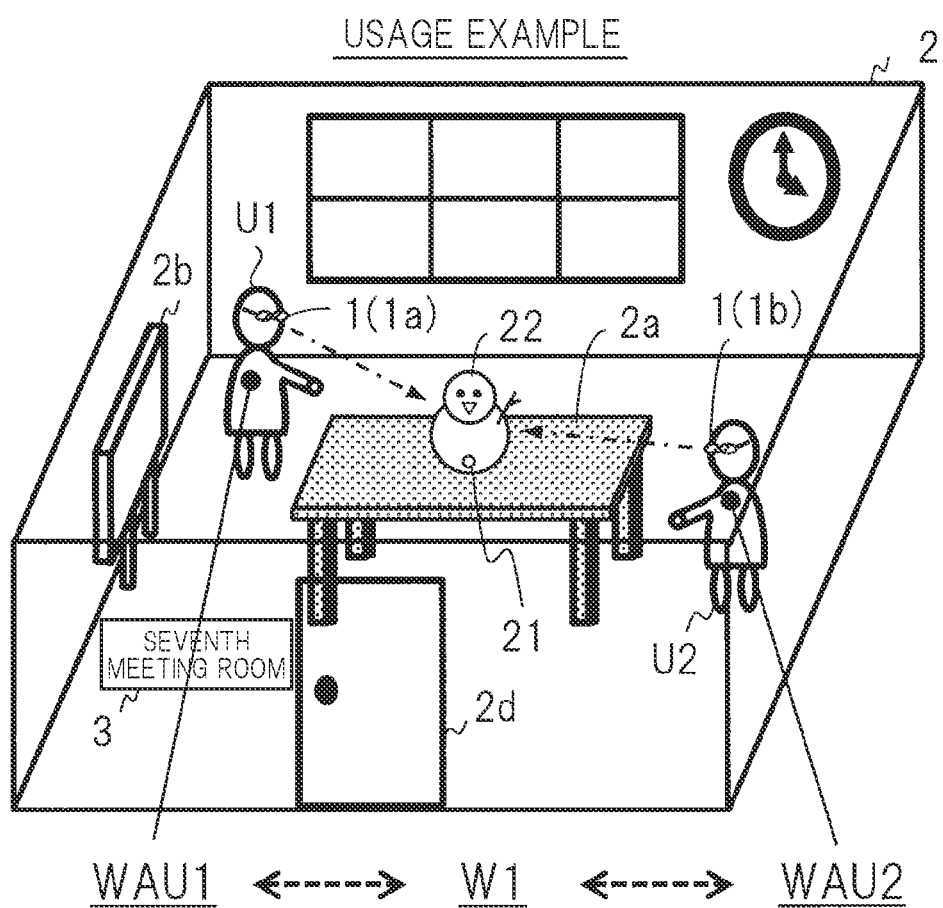
FIG. 4 is a view showing a usage example of the space in the first embodiment.

As an example of usage inside the space 2 of FIG. 3, FIG. 4 shows an example in which two users U1 and U2 share the space coordinate system W1 corresponding to the space 2 of this room while the respective information terminals 1 display the same AR virtual image 22 at the same position 21. The user U1 performs the coordinate system pairing of a terminal coordinate system WAU1 of his/her own HMD 1a with respect to the space coordinate system W1 through the label 3. As similar to the user U1, the user U2 performs the coordinate system pairing of a terminal coordinate system WAU2 of his/her own HMD 1b with respect to the same space coordinate system W1 through the label 3. Accordingly, the HMD 1a of the user U1 and the HMD 1b of the user U2 are in a state of sharing the position recognition through the same space coordinate system W1. In this state, both of the HMD 1a of the user U1 and the HMD 1b of the user U2 can display the same virtual image 22 at the same desired position inside the space 2, for instance, to match a central position 21 on an upper surface of the desk 2a that has been designated by one user. The user U1 and the user U2 can operate or communicate with each other while looking at the same virtual image 22.

The space shape data 6A also includes, for instance, data of the shape of the desk 2a. The shape data includes the position and the direction in the space coordinate system W1. For instance, the HMD 1a displays the virtual image 22 on its own display surface 11 to match the position 21 designated by the user U1. At this time, the HMD 1a uses the conversion parameter 7 to convert the position 21 in the space coordinate system W1 into a position in the terminal coordinate system WAU1. To the HMD 1b through the wireless communication, the HMD 1a may also transmit the position 21 at which the virtual image 22 shall be displayed or data of the virtual image 22 that is the display target. The HMD 1b displays this virtual image 22 at the position 21 transmitted by the HMD 1a.

[Space Data]

The information terminal 1 has a function such as AR (such as a corresponding application program or the like) that enables handling the space data 6 including the space shape data 6A of FIG. 2. The space shape data 6A is, for instance, polygon data with a surface data aggregate of a plurality of surfaces configuring the space 2. More particularly, the space shape data 6A is data of the floor, the wall, the ceiling or the like or data of other equipment such as the table 2a or the whiteboard 2b. Note that the border of the space 2 is not necessarily limited to the real object such as the wall but may be a border invisible to the user. The object disposed inside the space 2 may be an object such as equipment or a pipe inside the wall or the like invisible to the user. Their configurations correspond to settings of the contents of the space data 6, and are not limited. While the data group including label data 6B or the like is collectively named as the space data 6 for ease of explanation in the first embodiment, the present invention is not limited to this and other configurations are possible.

The label data 6B is data that defines the label 3, and includes the data representing the position, the direction or the shape of the label 3 or the like with respect to the space coordinate system W1 of the space 2, particularly includes the quantity data 202 (FIG. 2). When the label 3 is also regarded as a part configuring the space 2, note that the label 3 is defined as one of the objects in the space shape data 6A, and the label data 6B may be omitted.

The measurement-target position information 6C is data that defines how to measure the relation regarding the position or direction of the label 3 in the measurement from the information terminal 1. For instance, the measurement-target position information 6C is information that specifies three feature points or two feature lines of a measurement target. Moreover, when the measurement-target position information is preliminarily uniformly defined in this system and method irrespective of the space 2, the measurement-target position information 6C may be mounted in a control program of the information terminal 1 or the like. In the first embodiment, the measurement-target position information 6C can be set for each space 2 and each label 3.

[Label]

Figure 5A:
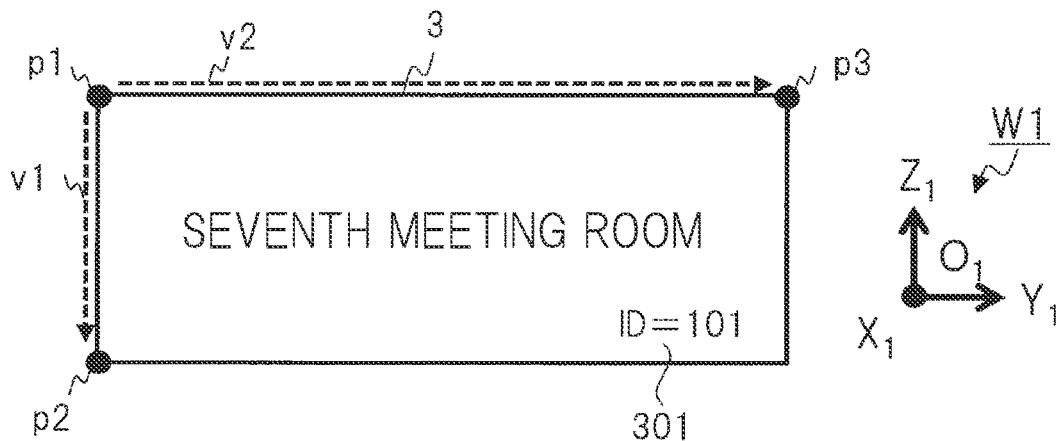
FIG. 5A is a view showing a configuration example of a label in the first embodiment.
Figure 5B:
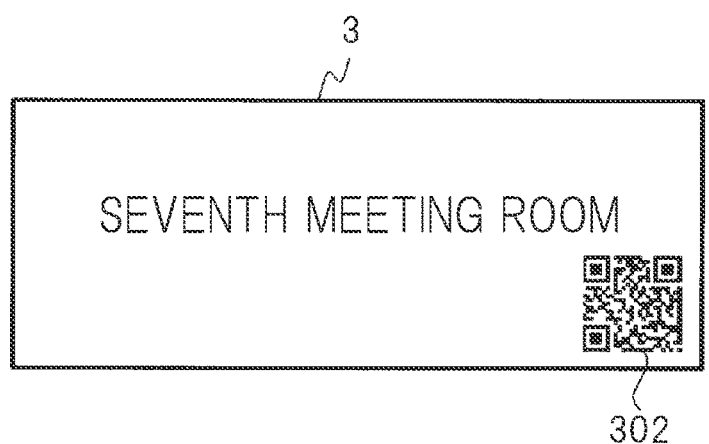
FIG. 5B is a view showing a configuration example of a label in the first embodiment.
Figure 5C:
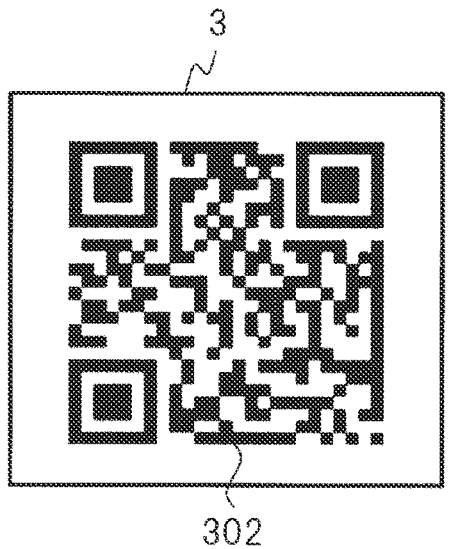
FIG. 5C is a view showing a configuration example of a label in the first embodiment.
Figure 5D:
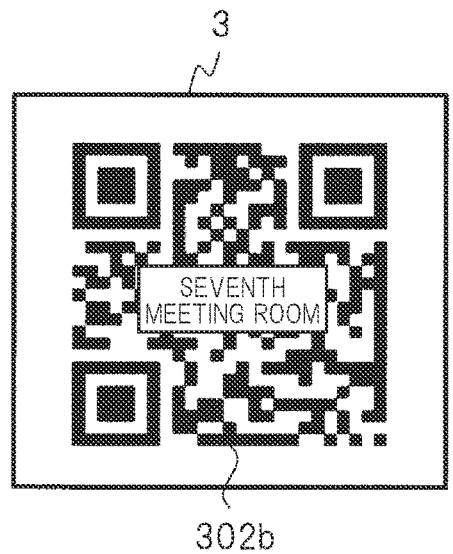
FIG. 5D is a view showing a configuration example of a label in the first embodiment.

FIG. 5A to FIG. 5D show configuration examples of the label 3. FIG. 5A is a first example, FIG. 5B is a second example, FIG. 5C is a third example, and FIG. 5D is a fourth example. The label 3 in FIG. 5A is a surface (also referred to as label surface) such as a wide rectangular plate on which a letter string "Seventh Meeting Room" representing the name of the room is described. In this example, the label surface is disposed on an $Y_1$-$Z_1$ surface of the space coordinate system W1. Further, in this example, an ID 301 of the space 2 is directly described onto a spot of the label surface as a letter string. The information terminal 1 can recognize the ID 301 by using the camera 12. The configuration of the shape of the label 3 or the like is described in the label data 6B. The label surface has four corner points, out of which points p1, p2, p3 as three corner points are preliminarily defined as the feature points of the specific target object that is the measurement target. For instance, the point p1 is defined as an upper left corner point of the label surface, the point p2 is defined as a lower left corner point of the label surface, and the point p3 is defined as an upper right corner point of the label surface. The measurement-target position information 6C includes the specification of the three feature points or the corresponding two feature lines. In other words, the measurement-target position information 6C includes an instruction that indicates necessity for measurement of the two feature lines (two corresponding specific directions) on the left side and the upper side of the label 3. The point p1 is defined as a feature point representing a representative position of the label 3. Note that the feature points such as the point p1 and the feature lines such as a vector v1 are illustrated for the purpose of explanation, but are practically not shown. Alternatively, the feature points or feature lines may be intentionally shown on the label surface as specific images, and may be recognized by the user or the information terminal 1.

The information terminal 1 measures the three feature points (points p1 to p3) as the targets in measuring the relation with the label 3 as the quantity data 201 based on the measurement-target position information 6C. The information terminal 1 measures a relation with these three points by, for instance, analyzing the image from the ranging sensor 13 or the camera 12. Recognition of the positions of the three points in the terminal coordinate system WA means that the two feature lines corresponding to the illustrated two vectors v1, v2 can be recognized. The vector v1 is a vector heading from the point p1 to the point p2 corresponding to the left side of the label surface while the vector v2 is a vector heading from the point p1 to the point p3 corresponding to the upper side of the label surface.

The ID of the space 2 is described at one spot of the label surface on the label 3 in FIG. 5B as similar to that of FIG. 5A in a format of a code image 302 that is a coded image. As the code image 302, a two-dimensional code such as a QR code (QR: Quick Response, registered trademark) may be used. Alternatively, such ID 301 and code image 302 may be an URL for access to the space data 6 of the server 4 or a coded image of the URL. The information terminal 1 extracts the code image 302 from the image captured by the camera 12, and acquires the information such as the ID through a decoding.

The letter string of the name of the space 2 is not written on the label surface of the label 3 in FIG. 5C, and only the rectangular code image 302 is displayed thereon. In this case, the information terminal 1 may similarly measure the three corner points of the code image 302 as for the relation with the label 3. The three corner points may also be three finder patterns (position detecting symbols) for recognizing QR code.

Similarly, only the code image 302b of the type in which the letter string of the name of the space 2 is written on the label surface of the label 3 of FIG. 5D is displayed thereon. Also in this case, similar processes can be performed.

The configuration of the above-described feature points or feature lines (two specific directions) for measuring the relation with the label 3 to be the quantity data 201 of the terminal side is not limited to the above-described examples, other configurations are possible, and any configuration can be defined by the measurement-target position information 6C. For instance, the three feature points or two feature lines may be written as a specific image in the label surface. Alternatively, the feature points or feature lines to be the measurement target may be defined at a place that is far by a prescribed positional relation from the object of the label 3 in the space coordinate system W1.

The quantity data 202 of the space side (FIG. 2) includes a coordinate value that is representation of a position of at least one feature point (for instance, the point p1) of the label 3 in the space coordinate system W1. Moreover, the quantity data 202 includes either a coordinate value of another two feature points (for instance, the points p2 and p3) in the space coordinate system W1 or representation of the feature lines in two different directions (for instance, the vector v1 and v2) in the space coordinate system W1 as the feature line data. One feature line (for instance, the vector v1) and two feature points (for instance, the points p1 and p2) are alternative.

The position information of the space 2 or the label 3 may be also included as the ID of the space data 6 that can be read from the label 3. The position information may either be general data such as latitude, longitude and altitude, or be of a local representation format in the building. The position information is convenient for classifying and searching the space data 6 when existing, and can also be used for making an inquiry about the position of the label 3 near the position of its own device, to the server 4. The server 4 may reply the information about the label 3 near the position of the terminal which has sent the inquiry while attaching an image of the label 3.

[Information Terminal (HMD)]

Figure 6:
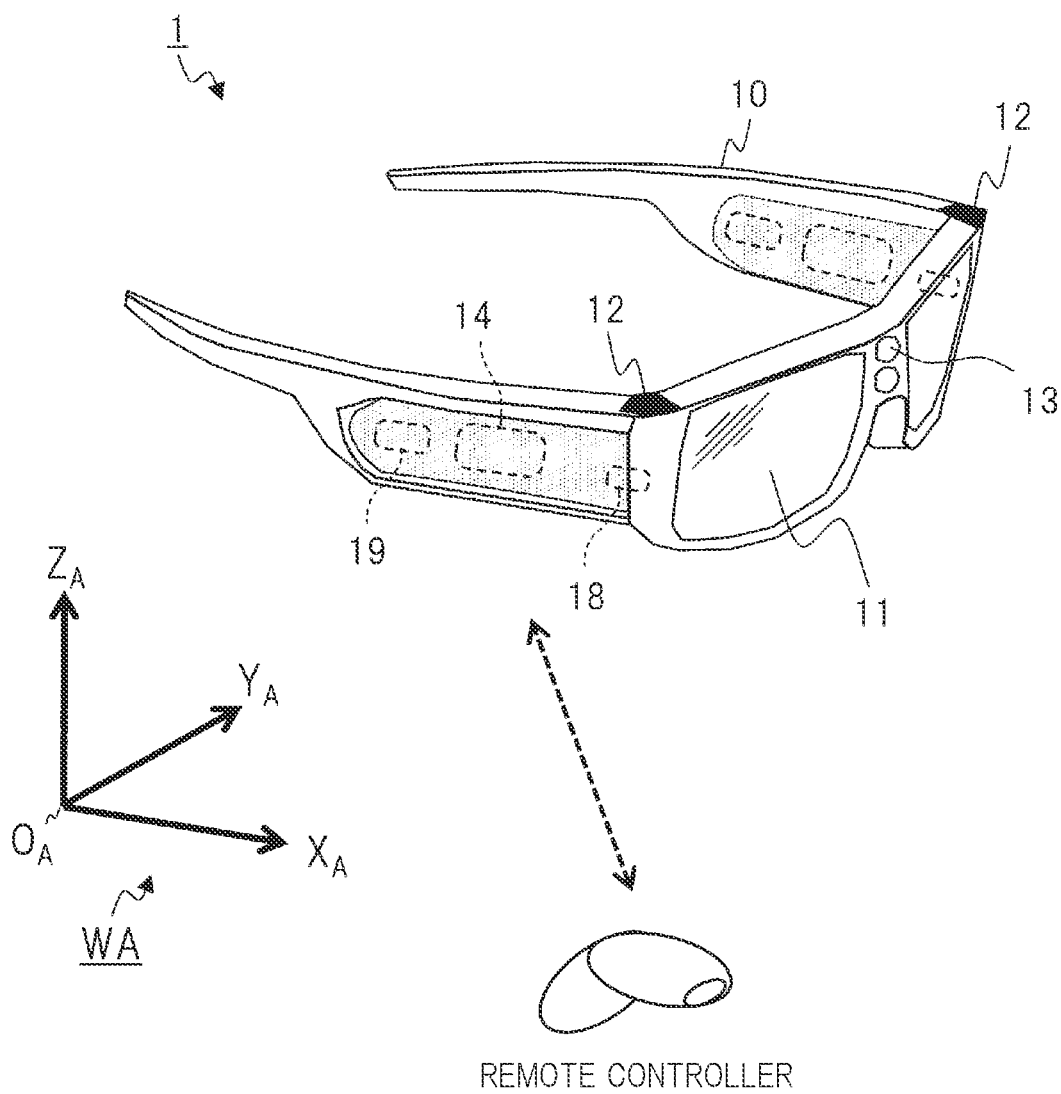
FIG. 6 is a view showing a configuration example of an appearance of an HMD as an example of an information terminal in the first embodiment.

FIG. 6 shows a configuration example of an appearance of the HMD 1A as the example of the information terminal 1. In the HMD 1A, a display device including a display surface 11 is included in an eyeglasses-like housing 10. The display device is, for instance, a transmission type display device in which an image is superimposed and displayed on a real image of external environment that is transmitted on the display surface 11. In the housing 10, a controller, the camera 12, the ranging sensor 13, other sensors 14 and the like are mounted.

The camera 12 has, for instance, two cameras disposed on both right and left sides of the housing 10, and captures and acquires the image in a range including the front of the HMD. The ranging sensor 13 is a sensor for measuring a distance between the HMD 1A and an object of the external environment. The ranging sensor 13 may be a sensor of TOF (Time Of Flight) type, a stereo camera or other types. The sensors 14 include a sensor group for detecting the states of the position and direction of the HMD 1A. On right and left sides of the housing 10, an audio input apparatus 18 including a microphone, an audio output apparatus 19 including a speaker or an earphone terminal and the like are mounted.

An actuator such as a remote controller may be attached to the information terminal 1. In this case, the HMD 1A performs, for instance, near field communication with the actuator. By manually manipulating the actuator, the user can input instructions related to functions of the HMD 1A or make cursor movements on the display surface 11 or the like. The HMD 1A may communicate and cooperate with an external smartphone or personal computer or the like. For instance, the HMD 1A can receive image data for the AR from an application of the smartphone 1B.

The information terminal 1 includes an application program or the like for displaying, for instance, the virtual image of AR or the like on the display surface 11 for supporting operations or for amusement. For instance, the information terminal 1 generates the virtual image 22 for the operation support through an application process for the operation support, and disposes and displays the virtual image 22 at the prescribed position 21 near an operation target inside the space 2 on the display surface 11.

Figure 7:
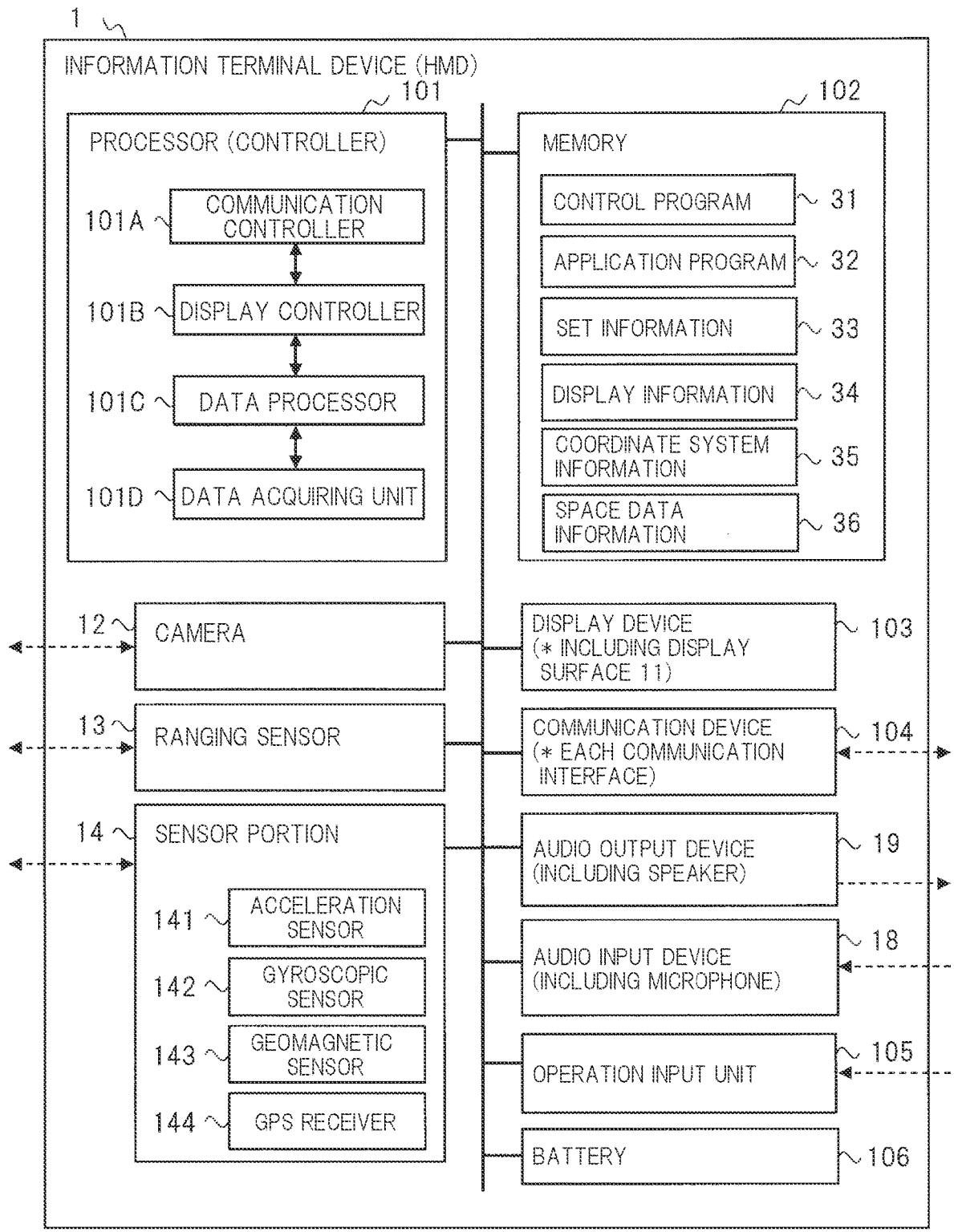
FIG. 7 is a view showing an example of a configuration of a function block of the HMD as an example of the information terminal in the first embodiment.

FIG. 7 shows a configuration example of a function block of the HMD 1A of FIG. 6. The information terminal 1 includes the processor 101, the memory 102, the display device 103 including the camera 12, the ranging sensor 13, the sensor portion 14 and the display surface 11, the communication device 14, the audio input device 18 including the microphone, the audio output device 19 including the speaker or the like, an operation input portion 105, a battery 106 and the like. These components are mutually connected through busses or the like.

The processor 101 is made of a CPU, a ROM, a RAM and the like, and configures a controller of the HMD 1A. By performing processes in accordance with a control program 31 or an application program 32 of the memory 102, the processor 101 achieves functions of an OS, a middleware or an application or the like and other functions. The memory 102 is made of a nonvolatile storage apparatus or the like, and stores various data or information handled by the processor 101 or the like. The memory 102 also stores images acquired through the camera 12 or the like, detection information or the like as temporary information.

The camera 12 acquires images by converting incident light from a lens into electric signals through imaging elements. For instance, when, a TOF sensor is used, the ranging sensor 13 calculates a distance to an object, based on time taken from hitting of light emitted to the external environment against the object to return of the light. The sensor portion 14 includes, for instance, an acceleration sensor 141, a gyroscope sensor (angular velocity sensor) 142, a geomagnetic sensor 143 and a GPS receiver 144. The sensor portion 14 detects the states of the position, the direction or the movement of the HMD 1A or the like using detection information of these sensors. The HMD 1A is not limited to this configuration, and may also include an illuminance sensor, a proximity sensor, an atmospheric pressure sensor or the like.

The display device 103 includes a display drive circuit or the display surface 11, and displays the virtual image 22 or the like on the display surface 11 based on the image data of the display information 34. Note that the display device 103 is not limited to a transmission type display device, and may also be a non-transmission type display device or the like.

The communication device 104 includes a communication processing circuit, an antenna or the like corresponding to prescribed various communication interfaces. As examples of the communication interfaces, a mobile network, Wi-Fi (registered trademark), Bluetooth (registered trademark), infrared ray and the like are exemplified. The communication device 104 performs a wireless communication process or the like between itself and other information terminal 1 or an access point 23 (FIG. 1). The communication device 104 also performs a near field communication process with the actuator.

The audio input device 18 converts input audio output from the microphone into audio data. The audio output device 19 outputs audio based on the audio data from a speaker or the like. The audio input device may include an audio recognition function. The audio output device may include an audio synthesizing function. The operation input portion 105 is a portion receiving operation inputs to the HMD 1A such as power ON/OFF and volume leveling, and is made of a hardware button, a touch sensor or the like. The battery 106 supplies power to each component.

As a configuration example of a function block achieved by processing, the controller made of the processor 101 has a communication controller 101A, a display controller 101B, a data processor 101C and a data acquisition portion 101D.

The control program 31, the application program 32, the setting information 33, the display information 34, the coordinate system information 35, the space data information 36 or the like are stored in the memory 102. The control program 31 is a program for achieving control including the space recognition function. The application program 32 is a program achieving the function of AR or the like using the space data 6. The setting information 33 includes system setting information or user setting information related to respective functions. The display information 34 includes image data or position coordinate information for displaying the image such as the virtual image 22 on the display surface 11.

The coordinate system information 35 is management information related to the space recognition function. The coordinate system information 35 includes the information of the terminal coordinate system W1 of its own device, the information of the space coordinate system W1 of the target space 2, the quantity data 201 of the terminal side, the quantity data 202 of the space 2 side, and the conversion parameter 7. The information of the space coordinate system W1 and the quantity data 202 of the space 2 side are acquired from the space data 6.

The space data information 36 is information of the space data 6 stored in the information terminal 1 as the library and the space data 6 acquired from the server 4. Note that, when the space data 6 has been measured by its own device, the information terminal 1 also records the measured data with the suitable feature object of the external environment as the label 3. Moreover, as the space ID, the information terminal 1 records information enabling the space 2 to be specified, such as the label of the meeting room.

The communication controller 101A controls communication processes using the communication device 104 at the time of, for instance, acquiring the space data 6 or the like from the server 4. The display controller 101B controls displays of the virtual image 22 or the like onto the display surface 11 of the display device 103 using the display information 34.

The data processor 101C reads and writes the coordinate system information 35 to perform management processes of the terminal coordinate system WA, coordinate system pairing processes with the space coordinate system W1, conversion processes between the coordinate systems using the conversion parameter 7 or the like. In the coordinate system pairing, the data processor 101C performs acquisition processes of the quantity data 202 of the space 2 side from the space data 6, measurement processes of the quantity data 201 of the terminal side, generation processes of the conversion parameter 7 or the like.

The data acquisition portion 101D acquires respective detection data from the camera 12 and various sensors such as the ranging sensor 13, the sensor portion 14 or the like. In the coordinate system pairing, the data acquisition portion 101D measures the quantity data 201 of the terminal side in accordance with the control made by the data processor 101C.

[Coordinate System Pairing (1-1)]

FIG. 8 shows an explanatory view related to the coordinate systems and the quantities in the case of the coordinate system pairing inside the real space corresponding to FIG. 1 or the like using the space data 6 of the target space 2 made by the HMD 1A that is the information terminal 1 of the user U1. As the coordinate system pairing, the information terminal 1 performs operations of adapting its own terminal coordinate system WA to the space coordinate system W1 of the target space 2, in other words, operations of correlating the terminal coordinate system WA and the space coordinate system W1. Hereinafter, a case of the coordinate system pairing performed between the terminal coordinate system WA of the HMD 1A and the space coordinate system W1 of a certain space 2 will be described.

In the coordinate system pairing, the information terminal 1 either acquires the space data 6 that is specified based on the ID recognized from the label 3 in the space 2 from the server 4 (Step S2 in FIG. 2) or uses information if this information corresponding to the space data 6 is held within its own device. The space data 6 includes the space shape data 6A, the label data 6B and the measurement-target position information 6C of FIG. 2. The label data 6B includes quantity 802 $\{N_1, M_1, d_1\}$ related to the label 3. The quantity 802 corresponds to the quantity data 202 of the space side in FIG. 2. The measurement-target position information 6C is information defining measurement of the quantity 801. The information terminal 1 measures the prescribed quantity 801 $\{N_A, M_A, d_A, P_{1A}\}$ related to its own device. The quantity 801 corresponds to the quantity data 201 of the terminal side in FIG. 2.

Then, the information terminal 1 calculates a relation between the terminal coordinate system WA and the space coordinate system W1 based on the quantity 801 of the terminal side and the quantity 802 of the label 3 side (corresponding space 2 side). The information terminal 1 calculates a conversion parameter 7 for converting positions or directions between the two coordinate systems, the terminal coordinate system WA and the space coordinate system W1. The information terminal 1 sets and holds the conversion parameter 7 generated through calculation in its own device. Accordingly, the information terminal 1 can convert positions or the like between the two coordinate systems inside the space 2 represented by the space data 6 by suitably using the conversion parameter 7. The above actions are described as coordinate system pairing for explanation.

[Coordinate System Pairing (1-2)]

In the first embodiment, information of the following elements is included as the quantity in the coordinate system pairing. The quantity includes a specific direction vector as first information, a global coordinate value as second information and a label position vector as third information. More particularly, as shown in FIG. 8, the quantity 802 of the label 3 side corresponding to the space 2 (the quantity data 202 of FIG. 2) includes three pieces of information that are (1) a first specific direction vector $N_1$, (2) a second specific direction vector $M_1$, and (3) a coordinate value $d_1$ related to a position L1 of the label 3. The quantity 801 of the information terminal 1 side (the quantity data 201 of FIG. 2) includes four pieces of information that are (1) a first specific direction vector $N_A$, (2) a second specific direction vector $M_A$, (3) a coordinate value $d_A$ related to a position LA of the information terminal 1, and (4) a label position vector $P_{1A}$. These quantities will be sequentially explained below.

1. Regarding Specific Direction Vector:

Unit vectors for two different specific directions inside the real space are defined as "n" and "m". Representations of these unit vectors n, m in the space coordinate system W1 are defined as $n_1$, $m_1$, and representations of these unit vectors in the terminal coordinate system WA of the information terminal 1 are defined as $n_A$, $m_A$.

In the example of FIG. 8, the two specific directions of the label 3 side are the first specific direction vector $N_1$ and the second specific direction vector $M_1$ corresponding to two feature lines (vectors v1, v2) of the label 3 of FIG. 5. The representations $n_1$, $m_1$ of the specific directions ($N_1$, $M_1$) in the space coordinate system W1 related to the label 3 are preliminarily described in the label data 6B inside the space data 6.

In the example of FIG. 8, the two specific directions of the information terminal 1 side are the first specific direction vector $N_A$ and the second specific direction vector $M_A$. The information terminal 1 measures the representations $n_A$, $m_A$ of the specific directions ($N_A$, $M_A$) in the terminal coordinate system WA. A vertical downward direction (gravity direction) or a geomagnetic direction may be used as the specific directions of the information terminal 1 side. When the gravity direction is used as one specific direction, the gravity direction can be measured as a direction of gravitational acceleration by a triaxial acceleration sensor which is an acceleration sensor 141 of the information terminal 1 (FIG. 7). Alternatively, the vertical downward direction may be set as a negative direction of the illustrated Z axis ($Z_A$, $Z_1$) in the settings for the terminal coordinate system WA and the space coordinate system W1. In either case, the vertical downward direction which is the specific direction does not change in the global coordinate system, and therefore, does not need to be measured for each coordinate system pairing.

When the geomagnetic direction such as a northward direction is used as the specific direction, the geomagnetic direction can be measured by a geomagnetic sensor 143 (FIG. 7). Since geomagnetism may be affected by structures, it is preferable to measure the geomagnetic direction for each coordinate system pairing. If it is known that the influence of the structures is sufficiently small, the geomagnetic direction does not need to be measured for each coordinate system pairing.

The representations of the directions of the two feature lines (the corresponding vectors v1, v2) inside the label 3 viewed in the terminal coordinate system WA can be used for the specific direction of the information terminal 1 side. In this case, the information terminal 1 measures the specific direction corresponding to the feature line (such as the vector v1) of the label 3 in the terminal coordinate system WA, and acquires the representation of the specific direction in the terminal coordinate system WA. This measurement can be performed by, for instance, the ranging sensor 13. At this time, the information terminal 1 measures, for instance, respective coordinate values of two feature points (points p1, p2) including the feature line corresponding to the vector v1 in the terminal coordinate system WA. Then, the information terminal 1 acquires the representation of the specific direction vector ($N_1$) in the terminal coordinate system WA from the coordinate values of the two points. The representation of the specific direction vector ($N_1$) differs from the representation of the first specific direction vector $N_A$ of the quantity 802 of the label 3 side.

2. Regarding Global Coordinate System:

A coordinate value of one feature point (such as the point p1) representing the position L1 of the label 3 side in the space coordinate system W1 is defined to be "$d_1=(x_1, y_1, z_1)$". The coordinate value $d_1$ is preliminarily described in the label data 6B. Note that the representative position L1 of the label 3 is represented by the point p1. However, the invention is not limited to this, and different definitions are also possible. A coordinate value of the position LA of the information terminal 1 side in the terminal coordinate system WA is defined to be "$d_A=(x_A, y_A, z_A)$". Note that the representative position LA of the information terminal 1 is represented by the central position of the housing 10. However, the invention is not limited to this, and different definitions are also possible. These coordinate values are parameters that are defined in accordance with the settings for the space coordinate system W1 and the terminal coordinate system WA to be the global coordinate system. Note that the terminal position vector $V_A$ indicates a vector heading from an origin $O_A$ of the terminal coordinate system WA to the position LA. The feature point position vector $V_1$ indicates a vector heading from an origin $O_1$ of the space coordinate system W1 to the position L1.

In the example of FIG. 8, the position of the origin $O_A$ of the terminal coordinate system WA differs from the position LA of the information terminal 1, and the position of the origin $O_1$ of the space coordinate system W1 differs from the position L1 of the label 3. The following explanation will be made in such a general case in which the origin of the global coordinate system does not coincide with the position of the information terminal 1 or the position of the label 3. The invention is not limited to this case, and there may also be cases in which the origin of the terminal coordinate system WA coincides with the position of the information terminal 1 or the origin of the space coordinate system W1 coincides with the position of the label 3, and the invention is similarly applicable also in those cases. As the former example, a case in which the information terminal 1 sets its own position as the origin $O_A$ of the terminal coordinate system WA at the time of startup is exemplified. As the latter example, a case in which a prescribed position inside the space 2 such as a room is preliminarily set in the space data 6 as the origin $O_1$ of the space coordinate system W1 is exemplified.

3. Regarding Label Position Vector $P_{1A}$:

The label position vector $P_{1A}$ is a vector heading from the position LA (the coordinate value $d_A$) of the information terminal 1 to the position L1 (the coordinate value $d_1$) of a feature point of the label 3. In other words, the label position vector $P_{1A}$ is a representation of the position L1 of the label 3 in the terminal coordinate system WA. The information terminal 1 can measure the label position vector $P_{1A}$ by using, for instance, the ranging sensor 13. From this label position vector $P_{1A}$, it is possible to acquire information of a relation between the two coordinate systems that are the terminal coordinate system WA and the space coordinate system W1.

[Conversion Parameter]

By the above acquisition and measurement of the quantity at the time of the coordinate system pairing, the information terminal 1 recognizes the relation between the terminal coordinate system WA and the space coordinate system W1 from the relation with the label 3, and can calculate the conversion parameter 7 between the two coordinate systems. The conversion represented by the conversion parameter 7 is a conversion for matching the space coordinate system W1 to the terminal coordinate system WA or oppposingly for matching the terminal coordinate system WA to the space coordinate system W1. The conversion parameter 7 is a parameter for calculating the conversion (in other words, rotation) of the two coordinate systems (WA, W1) in triaxial directions and the difference between the origins ($O_A$, $O_1$) of the two coordinate systems (WA, W1). As an example of the conversion parameter 7, FIG. 8 shows an example of a table of the conversion parameter 7 defining the conversion for matching the position in the space coordinate system W1 or the like to the position in the terminal coordinate system WA or the like. As a configuration example, this table of the conversion parameter 7 includes identification information of the space coordinate system W1, identification information of the terminal coordinate system WA, representation information ($q_{A1}$ to be described later) of the rotation between the two coordinate systems, and representation information (inter-origin vector $o_{1A}$) of the origins between the two coordinate systems.

After establishing the above coordinate system pairing, the information terminal 1 can rapidly recognize the position or the shape of the arrangement configuring the space 2 represented by particularly the space shape data 6A of the space data 6 or the like without the necessity of performing the measurement process on its own. Based on the recognition, the information terminal 1 can accurately display the virtual image 22 on the display surface 11 to be matched at the desired position 21 inside the space 2 as illustrated in FIG. 4. The desired position 21 can be designated by the user U1 through operations or automatically determined in accordance with the application program of the information terminal 1 or the like.

In FIG. 8, note that the position vector $G_A$ is a vector for the display position 21 of the virtual image 22 in the terminal coordinate system WA, and the position coordinate value $r_A$ is a coordinate value of this position 21. The position vector $G_1$ is a vector for the position 21 in the space coordinate system W1, and the position coordinate value $r_1$ is a coordinate value of this position 21. The inter-origin vector $o_{1A}$ is a vector heading from the origin $O_A$ to the origin $O_1$, and is a representation of the origin $O_1$ in the terminal coordinate system WA. The inter-origin vector $o_{A1}$ is a vector heading from the origin $O_1$ to the origin $O_A$, and is a representation of the origin $O_A$ in the space coordinate system W1.

As for the recognition of the information terminal 1 for the position of the arrangement inside the space 2, the representation of the position in the space coordinate system W1 in the space data 6 may be converted into the representation in the terminal coordinate system WA by the conversion parameter 7. Opposingly, as for the recognition of the information terminal 1 for the position of the arrangement inside the space 2, the representation of the position in the terminal coordinate system WA may be converted into the representation of the position in the space coordinate system W1 by the conversion parameter 7 (defining a conversion that is opposite to the above description). The information terminal 1 only needs to use at least either one of the above two conversions (the corresponding conversion parameter 7), or may use both conversions.

[Control Flow]

Figure 9:
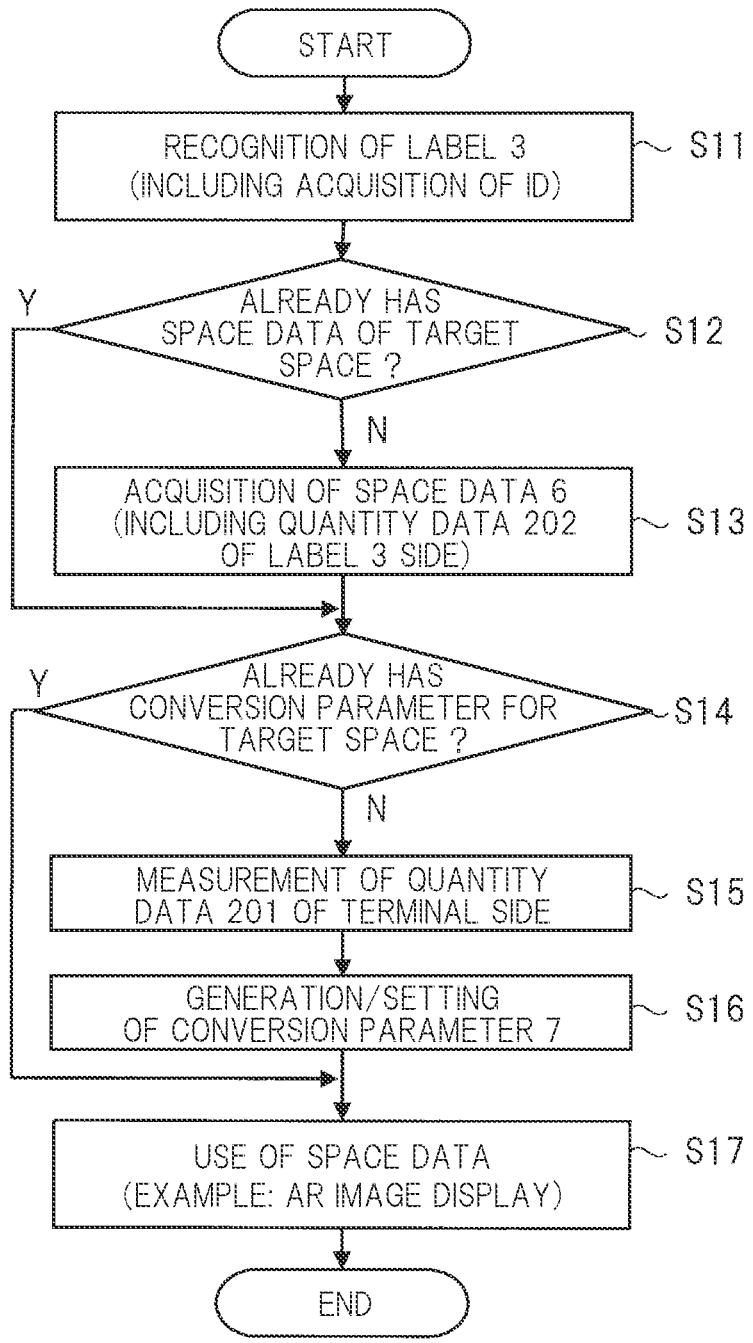
FIG. 9 is a view showing a control flow of the information terminal in the first embodiment.

FIG. 9 shows a control flow of the information terminal 1. The flow of FIG. 9 includes steps S11 to S17. In Step S11, the information terminal 1 recognizes the label 3 by using the camera 12, the ranging sensor 13 or the like, and acquires the ID of the space 2 from the label 3. The information terminal 1 starts procedures of establishing the coordinate system pairing based on the recognition of the label 3.

In Step S12, the information terminal 1 confirms whether the space data 6 designated by the ID has been already stored in the information terminal 1 (the space data information 36 of the memory 102 of FIG. 7 or the like). If it has been stored therein (Y), the program proceeds to step S14. If it has not been stored therein (N), the program proceeds to step S13.

In Step S13, the information terminal 1 uses the ID to acquire the space data 6 from the DB 5 of the server 4 through communication using the communication device 104 (FIG. 7). The space data 6 includes the quantity data 202 of the label 3 side (the quantity 802 in FIG. 8).

In Step S14, the information terminal 1 confirms whether the conversion parameter 7 between the coordinate systems related to the target space 2 has been already stored in the information terminal 1 (the coordinate system information 35 of the memory 102 in FIG. 7 or the like). If it has been stored therein (Y), the program skips steps S15, S16 and proceeds to step S17.

In Step S15, the information terminal 1 measures the quantity data 201 of the terminal side (the quantity 801 of FIG. 8) by using the camera 12, the ranging sensor 13 or the like.

In Step S16, the information terminal 1 generates the conversion parameter 7 between the terminal coordinate system WA and the space coordinate system W1 by using the quantity data 202 of the label 3 side acquired in Step S13 and the quantity data 201 of the terminal side acquired in Step S15, and sets the parameter to its own device. Accordingly, the procedures of establishing the coordinate system pairing are terminated.

In Step S17, the information terminal 1 uses the space data 6 (the corresponding space data information 36) acquired in Step S13 for any method or purpose. Typically, the information terminal 1 displays the AR virtual image 22 at the desired position 21 as in FIG. 4 to be matched with the position or the shape of the arrangement in the space 2 represented by the space shape data 6A. After step S17, the present flow is terminated. Processes of the present flow are similarly repeated for each new label 3.

[AR Display Example]

Figure 10:
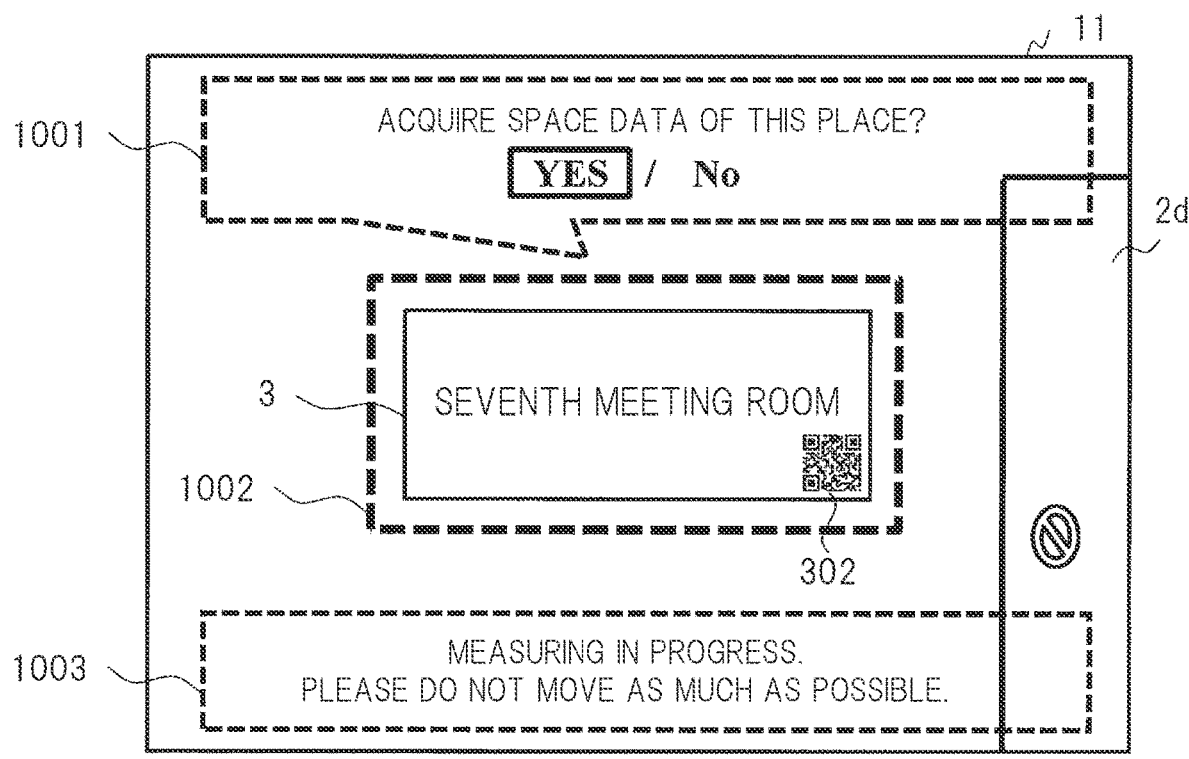
FIG. 10 is a view showing a screen display example of the information terminal in the first embodiment.

FIG. 10 shows an AR display example on the display surface 11 of the information terminal 1 at the time of the coordinate system pairing. The information terminal 1 may also perform the screen display for delivering operations or states to the user U1 and may output the audio accompanied by the display as a graphical user interface (GUI) related to the space recognition function. This example shows an example in which an image for guidance is displayed on the display surface 11 when the information terminal 1 measures the quantity 801 in step S15 of FIG. 9. This example shows a state in which the user U1 sees the label 3 as shown in FIG. 5(B) in front of the room as shown in FIG. 3. The label 3 can be seen on the display surface 11. The information terminal 1 recognizes the label 3 based on the image of the camera 12 in Step S11 of FIG. 9. At this time, the information terminal 1 superimposes and displays, for instance, an image 1001 or an image 1002 on the real image.

The image 1002 is a frame-like image surrounding the recognized label 3, and is information that understandably tells the user U1 that this is the specified label 3. The image 1002 may be an image surrounding the code image 302 or an image emphasizing the above-described feature lines or the like. The image 1001 is a message such as "Acquire space data of this place? YES/NO" displayed in accordance with the recognition of the label 3, and is information for making the user U1 confirm that the space data 6 needs to be acquired. By the operation of the user U1, "YES/NO" can be selected on the image 1001. When "YES" is selected, the information terminal 1 executes the processes following Step S11.

The image 1003 is a message such as "Measuring in progress: Please do not move as much as possible" displayed at the time of starting the measurement and during the measurement in Step S15. During the measurement of the quantity 801, highly accurate measurement can be achieved by making the information terminal 1 stationary to the utmost. For even higher accurate measurement, the information terminal 1 may output such guide information to the user U1.

[Coordinate Conversion (1)]

Hereinafter, details of the coordinate conversion between the terminal coordinate system WA and the space coordinate system W1 of FIG. 8 will be supplementarily explained. First, notations for explaining the relation of the coordinate systems will be summarized. In the present embodiment, the coordinate systems are unified into a right-handed system, and normalized quaternion is used for representing the rotations of the coordinate systems. The normalized quaternion shows a norm to be quaternion of 1, and can represent the rotation around an axis. The rotation of an any coordinate system can be represented by such normalized quaternion. A normalized quaternion "q" representing a rotation of an angle "η" with the rotating axis being a unit vector $(n_x, n_y, n_z)$ is expressed by the following equation 1. Terms "i", "j" and "k" are units of the quaternion. A clockwise rotation facing in the direction of the unit vector $(n_x, n_y, n_z)$ is a rotating direction in which "η" is positive.

$$q=\cos(\eta/2)+n_x \sin(\eta/2)i+n_y \sin(\eta/2)j+n_z \sin(\eta/2)k \quad \text{Equation 1:}$$

A real part of the quaternion q is represented to be Sc(q). A conjugate quaternion of the quaternion q is represented to be q*. An operator for normalizing the norm of the quaternion q to 1 is defined to be [.]. When the quaternion q is an optional quaternion, the definition of [.] is expressed by an equation 2. A denominator of the right side of the equation 2 is the norm of the quaternion q.

$$[q]=q/(qq^*)^{1/2} \quad \text{Equation 2:}$$

Next, a quaternion p representing a coordinate point or a vector $(p_x, p_y, p_z)$ is defined by an equation 3.

$$p=p_x i+p_y j+p_z k \quad \text{Equation 3:}$$

In the present specification, a symbol representing the coordinate point or the vector other than the component display is defined to be displayed in quaternion unless otherwise stated. A symbol representing the rotation is defined to be normalized quaternion.

A projection operator of a vector to a plane perpendicular to the direction of the unit vector "n" is defined to be $P_T(n)$. The projection of the vector "p" is expressed by an equation 4.

$$P_T(n)p=p+nSc(np) \quad \text{Equation 4:}$$

When a coordinate point or a direction vector $p_1$ is converted into a coordinate point or a direction vector $p_2$ by the rotating operation around the origin represented by the quaternion q, the direction vector $p_2$ can be calculated by an equation 5.

$$p_2=qp_1 q^* \quad \text{Equation 5:}$$

A normalized quaternion R $(n_1, n_2)$ that rotates the unit vector $n_1$ around an axis perpendicular to a plane including the unit vector $n_1$ and the unit vector $n_2$ so as to overlap the unit vector $n_2$ is expressed by an equation 6.

$$R(n_1,n_2)=[1-n_2 n_1] \quad \text{Equation 6:}$$

[Coordinate Conversion (2)]

Figure 11A:
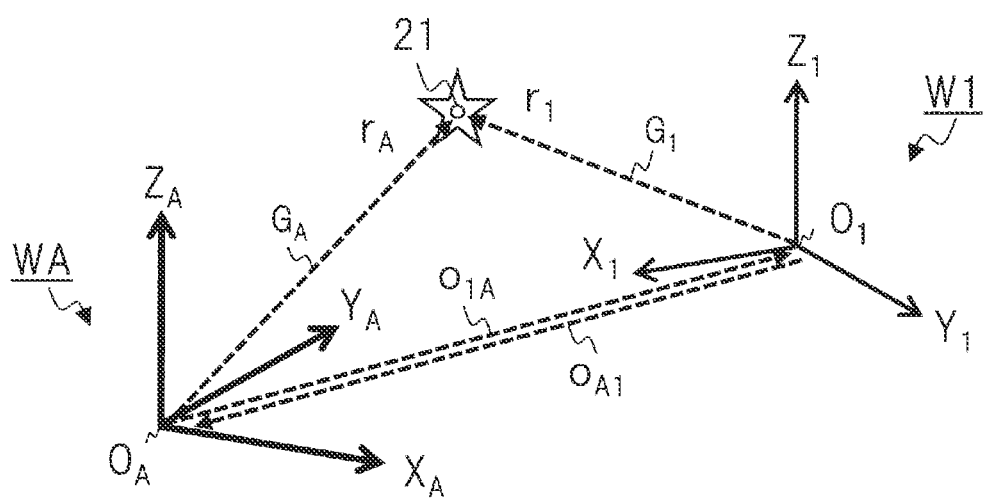
FIG. 11A is an explanatory view showing conversion of a coordinate system in the first embodiment.
Figure 11B:
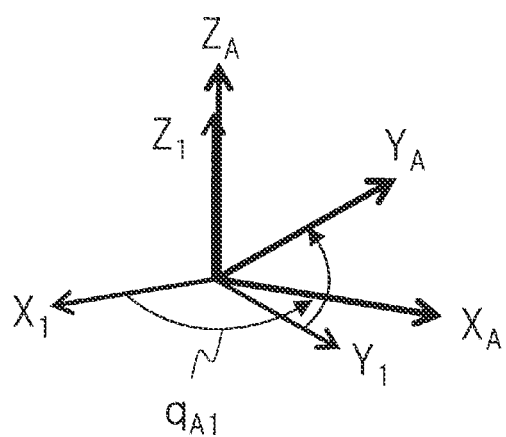
FIG. 11B is an explanatory view showing conversion of a coordinate system in the first embodiment.

FIGS. 11A and 11B show explanatory views of the coordinate system conversion. FIG. 11A shows, as similar to FIG. 8, a representation related to the same position 21 inside the real space between the two different coordinate systems that are the terminal coordinate system WA and the space coordinate system W1, and a representation of a difference between the coordinate origins $(O_A, O_1)$. The representation of the position 21 includes the position vector $G_A$, the position coordinate value $r_A$, the position vector $G_1$ and the position coordinate value $r_1$. The representation of the difference between the coordinate origins includes the inter-origin vector $o_{1A}, o_{A1}$. The inter-origin vector $o_{1A}$ is a representation of the origin $O_1$ of the space coordinate system W1 in the terminal coordinate system WA. The inter-origin vector $o_{A1}$ is a representation of the origin $O_A$ of the terminal coordinate system WA in the space coordinate system W1.

Based on the above-described quantities (FIG. 2, FIG. 8), representations $(n_A, n_1, m_A, m_1)$ of two different specific directions inside the real space can be provided in the respective coordinate systems (the terminal coordinate system WA, the space coordinate system W1). Therefore, the rotational operation between the coordinate systems to make these representations coincide with each other can be provided by the calculation using the normalized quaternion. Therefore, by matching the information with the information of respective coordinate origins, the position coordinate between the coordinate systems can be converted. That is, the conversion parameter 7 as shown in the example of FIG. 8 can be generated.

The relation of the coordinate systems (WA, W1) can be calculated as follows: Hereinafter, explanations will be made about the calculation for acquiring the rotation and the difference in the coordinate origin in the case of the conversion of the representation of the coordinate value and the vector value in the space coordinate system W1 describing space data 6 into the representation in the terminal coordinate system WA.

FIG. 11B shows the rotating operation for matching the directions between the space coordinate system WA and the terminal coordinate system W1, and simply shows, for instance, an image of the rotation $q_{A1}$ for matching the directions of respective axes $(X_1, Y_1, Z_1)$ of the space coordinate system W1 to the directions of respective axes $(X_A, Y_A, Z_A)$ of the terminal coordinate system WA.

First, the rotation for matching the directions of the terminal coordinate system WA and the directions of the space coordinate system W1 is acquired. At the beginning, a rotation $q_{r1}$ for overlapping the unit vector $n_A$ in the specific direction (FIG. 8) onto the unit vector $n_1$ (FIG. 8) in the rotation of the representation of the terminal coordinate system WA will be considered. The rotation $q_{r1}$ will concretely be below.

$$q_{r1}=R(n_A,n_1)$$

Next, rotation directions of the unit vectors $n_A, m_A$ in the specific directions (FIG. 8) rotated by this rotation $q_{r1}$ are defined to be $n_{A1}, m_{A1}$.

$$n_{A1}=q_{r1}n_A q_{r1}^*=n_1$$

$$m_{A1}=q_{r1}m_A q_{r1}^*$$

An angle formed by the direction $n_{A1}$ and the direction $m_{A1}$ is identical to an angle formed by the unit vector $n_1$ and the unit direction vector $m_1$ since the angles are between the same directions in the real space. Since it is a premise that the two specific directions are different directions, the angle formed by the unit vector $n_1$ and the unit direction vector $m_1$ is not zero. Accordingly, a rotation $q_{r2}$ around an axis that is the direction $n_{A1}$, that is, the unit vector $n_1$ for overlapping the direction $m_{A1}$ onto the unit direction vector $m_1$ can be provided. More specifically, the rotation $q_{r2}$ is expressed as follows:

$$q_{r2}=R([P_T(n_1)m_{A1}],[P_T(n_1)m_1])$$

The direction $n_{A1}$ is not changed by the rotation $q_{r2}$ because of being the same as the rotating axis direction $n_1$ of the rotation $q_{r2}$. The direction $m_{A1}$ is rotated by the rotation $q_{r2}$ to the unit direction vector $m_1$.

$$n_1=q_{r2}n_{A1}q_{r2}{}^*$$

$$m_1=q_{r2}m_{A1}q_{r2}{}^*$$

The rotation $q_{1A}$ is newly defined as follows:

$$q_{1A}=q_{r2}q_{r1}$$

By this rotation $q_{1A}$, the unit vector $n_A$ and the unit direction vector $m_A$ are rotated to the unit vector $n_1$ and the unit direction vector $m_1$.

$$n_1=q_{1A}n_Aq_{1A}{}^*$$

$$m_1=q_{1A}m_Aq_{1A}$$

Since the unit vector $n_A$ and the unit direction vector $m_A$ have been selected to be two different directions, this rotation $q_{1A}$ is the rotation that converts the direction representation in the terminal coordinate system WA into the direction representation in the space coordinate system W1. Opposingly, when a rotation that converts the direction representation in the space coordinate system W1 into the direction representation in the terminal coordinate system WA is defined as rotation $q_{A1}$, this rotation $q_{A1}$ is similarly as follows:

$$q_{A1}=q_{1A}{}^*$$

Next, a conversion equation of the coordinate values $d_A$, $d_1$ (FIG. 8) is acquired. The coordinate values $d_A$, $d_1$ mentioned here are quaternion representations of the coordinate values defined by the above equation 3. First, a coordinate value of an origin in the other coordinate system with respect to one coordinate system is acquired. As shown in FIG. 11A, a representation of a coordinate value of the origin $O_1$ of the space coordinate system W1 in the terminal coordinate system WA is $o_{1A}$, and a representation of a coordinate value of the origin $O_A$ of the terminal coordinate system WA in the space coordinate system W1 is $o_{A1}$. The coordinate value $d_A$ of the position LA of the information terminal 1 and the coordinate value $d_1$ of the position L1 of the feature point of the label 3 in the respective coordinate systems (WA, W1) are already provided. Therefore, their origin coordinate value representations ($o_{1A}$, $o_{1B}$) are acquired by the following equation A.

$$o_{1A}=d_A+P_{1A}-q_{A1}d_1q_{A1}{}^*$$

$$o_{A1}=d_1-q_{1A}(d_A+P_{1A})q_{1A}{}^* \qquad \text{Equation A:}$$

As it can be easily understood, the following relation is acquired.

$$o_{A1}=-q_{1A}o_{1A}q_{1A}{}^*$$

Lastly, a conversion equation of the coordinate value $r_A$ of the optional position 21 inside the real space in the terminal coordinate system WA and the coordinate value $r_1$ of the same in the space coordinate system W1 is provided as follows:

$$r_1=q_{1A}(r_A-o_{1A})q_{1A}{}^*=q_{1A}r_Aq_{1A}{}^*+o_{A1}$$

$$r_A=q_{A1}(r_1-o_{A1})q_{A1}{}^*=q_{A1}r_1q_{A1}{}^*+o_{1A}$$

When it is desirable to convert, for instance, the specific position 21 (the coordinate value $r_A$) seen in the terminal coordinate system WA to the position 21 (the coordinate value $r_1$) seen in the space coordinate system W1 as described above, the conversion can be calculated by the rotation $q_{1A}$, the coordinate value $r_A$ and the origin representation $O_{A1}$. Inversed conversion can similarly be calculated. The conversion parameter 7 of FIG. 8 can be made of the parameters (the rotation and the origin representation) already described above in the explanation for the coordinate conversion. Note that mutual conversion is easy as described above, and therefore, the parameters stored in the information terminal 1 or the like may be $q_{1A}$ instead of $q_{A1}$ or $o_{A1}$ instead of $o_{1A}$, and also vice versa.

[Usage Example of Space Data]

Figure 12:
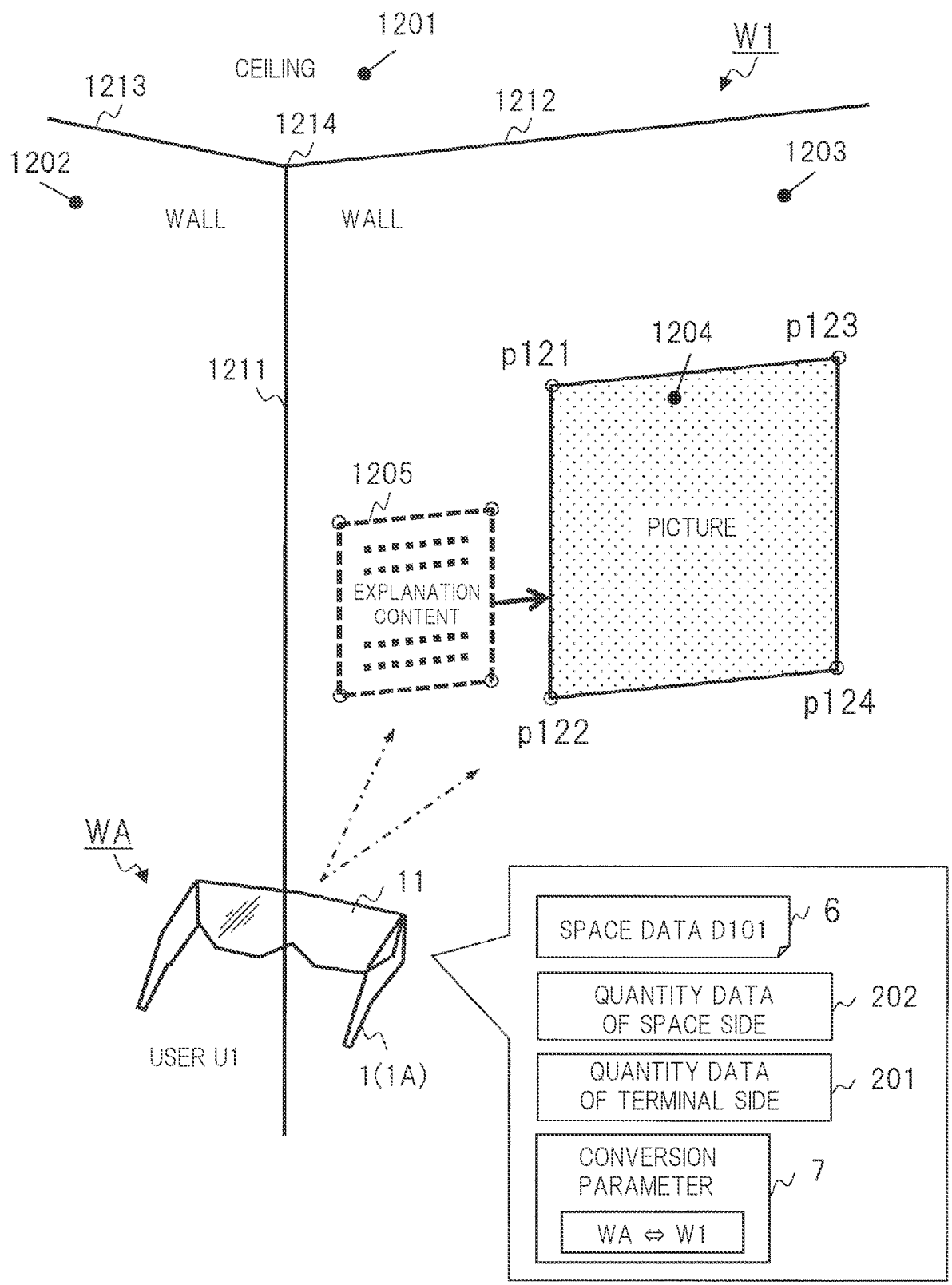
FIG. 12 is a schematic view showing a usage example of a space in the first embodiment.

FIG. 12 shows an example in which the information terminal 1 uses the space data 6 of the space 2 after the coordinate system pairing. Inside the room that is the space 2 where the user U1 uses the information terminal 1 in the example of FIG. 12, a ceiling 1201, a wall 1202, a wall 1203, a picture 1204 and the like are exemplified as the arrangements described in the space data 6. For instance, the HMD 1A that is the information terminal 1 of the user U1 but omitted in illustration can recognize the positions and the shapes of the walls 1202, 1203, the picture 1204 and the like inside the room by acquiring the space data 6 based on the label 3 and performing the coordinate system pairing as described above. In this example, these arrangements are schematically made of planes. For instance, the wall 1203 has coordinate values at positions of four corner points in the space coordinate system W1. The picture 1204 is disposed along a plane of the wall 1203, and similarly has coordinate values at positions of four corner points (points p121 to p124).

The information terminal 1 of the user U1 displays, for instance, an explanatory note of the picture 1204 as a virtual image 1205 by performing the AR function process. At this time, the information terminal 1 can rapidly display the virtual image 1205 of the explanatory note at a highly accurate position matching the position of the picture 1204 from a point of view of the user U1, that is, in the terminal coordinate system WA. For instance, as illustrated, the virtual image 1205 of the explanatory note can be displayed to be disposed in a region of a plane parallel to the plane of the wall 1203, the region being close to but not overlapping the region of the picture 1204.

Note that this virtual image 1205 is unique for this space 2 (and particularly the picture 1204). Such data of the virtual image 1205 may be included in the space data 6 together with the data of the picture 1204, virtual-image display position designating information or the like. Alternatively, such data of the virtual image 1205 may be registered in the server 4 as variable arrangement data that is different data from the space data 6 such as room or building data in correlation with the data. Alternatively, such data of the virtual image 1205 may be optionally generated and stored by the application program of the information terminal 1. The information terminal 1 may also determine a favorable position or the like for displaying the virtual image 1205 in accordance with its own position or direction or circumstances such as people close to the picture 1204.

[Effects or Others]

As described above, according to the space recognition system and method of the first embodiment, the information terminal 1 can suitably recognize and use the space 2 even when the coordinate system of the information terminal 1 side and the coordinate system of the space 2 side do not coincide with each other, and the information terminal 1 can suitably use the space data 6. The information terminal 1 can specify the space data 6 from the label 3, and can rapidly perform the coordinate system pairing at the position of the label 3. The position recognition can be shared between the information terminal 1 and the target space 2 by the coordinate system pairing, and the AR virtual images 22 can be rapidly and accurately displayed at the desired position 21. Further, by the information terminal 1 using the space data 6, various functions or services can be provided to the user.

[Modification Example—Adjustment Function (1)]

The following example is also possible as a modification example of the first embodiment. At the time of the recognition of the label 3 before the information terminal 1 of the user U1 enters the target space 2, errors in the adaption between the coordinate systems may occur in the coordinate system pairing. In consideration of such cases, the information terminal 1 in the modification example may include a function of adjusting the errors in the coordinate system pairing. More specifically, the information terminal 1 adjusts the errors in the coordinate system pairing for recognition of each label 3 of one or more labels 3 correlated to the space 2 or for each recognition even in the same label 3. The information terminal 1 may also adjust the conversion parameter 7 using the position, the feature point or the feature line of the arrangement inside the space 2. For instance, in explanation with reference to FIG. 12, after the coordinate system pairing based on the label 3 as shown in FIG. 3, the information terminal 1 may adjust the conversion parameter 7 inside the room, using borderlines 1211, 1212, 1213 related to the ceiling 1201 or the walls 1202, 1203 as the feature lines and an intersection 1214 of the borderlines 1211, 1212, 1213 as the feature points. In this case, the search and the measurement of the positional relation with the space 2 by the information terminal 1 at the time of the adjustment is search and measurement in a state of temporal establishment of the basic position recognition as the initial setting made by the coordinate system pairing with the label 3. Therefore, the search and the measurement for the point or line of the real object corresponding to the feature point or feature line inside the space data 6 can be more rapidly executed in this case than a case as seen in a related art in which the positional relation is not recognized at all.

Figure 13:
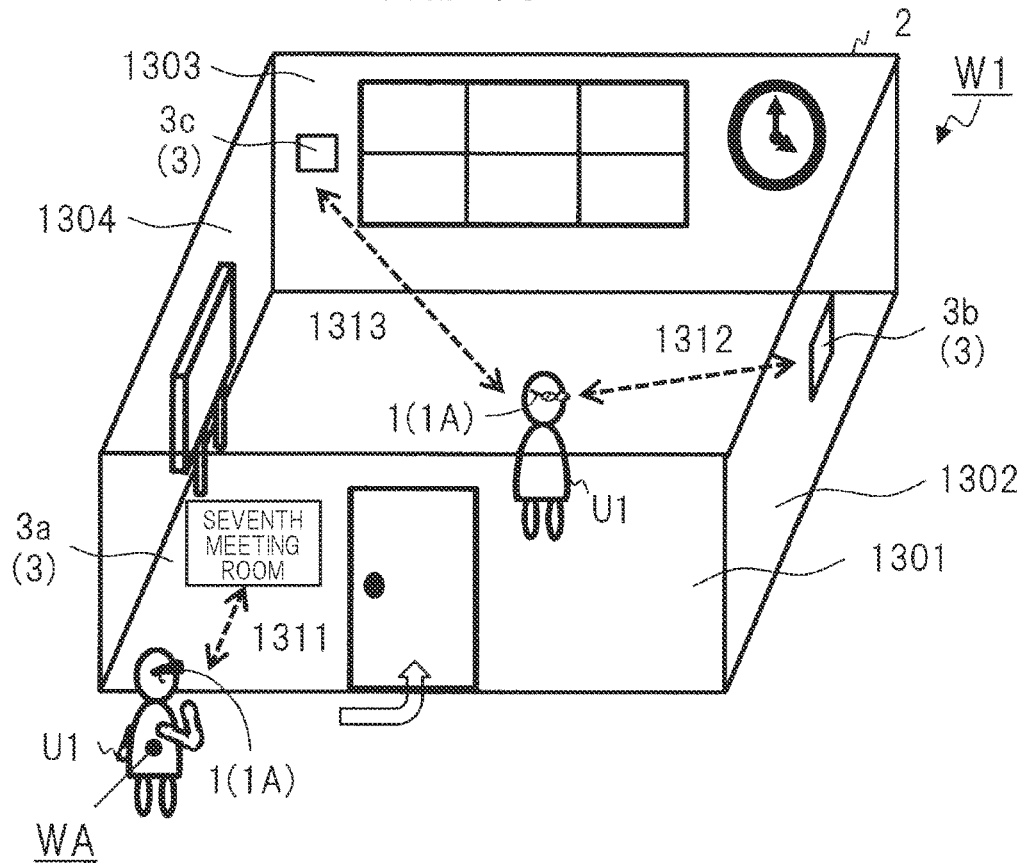
FIG. 13 is a view showing a configuration example of another label in a modification example of the first embodiment.

As a configuration example of another label 3 corresponding to a modification example, FIG. 13 shows a case in which a label 3 is set up also inside the room that is the space 2. A label 3*a* similar to the above-described one exists on an outer surface of a wall 1301 that is to be a boundary of the room that is the space 2. A label 3*b* is set up on a wall 1302 inside the room, and a label 3*c* is set up on a wall 1303. The information terminal 1 of the user U1 may use any of the labels 3 for the coordinate system pairing and the adjustment. As initial setting, the information terminal 1 of the user U1 performs the adaption of the terminal coordinate system WA to the space coordinate system W1 by performing a first coordinate system pairing 1311 for, for instance, the label 3*a*. Thereafter, the information terminal 1 of the user U1 suitably executes, for instance, a second coordinate system pairing 1312 for the label 3*b* or a second coordinate system pairing 1313 for the label 3*c* inside the room. At this time, the information terminal 1 can adjust the position and the direction of the information terminal 1 by adjusting the conversion parameter 7 for each time. Accordingly, even if the relation between the coordinate systems shifts or has errors, it is possible to make corrections, and, as a result, the accuracy of the AR display can be further improved.

[Modification Example—Adjustment Function (2)]

The arrangement inside the room 2 at the time of the coordinate system pairing, more particularly a movable object such as the table 2*a* in FIG. 3, may be possibly in a different state of the position of the arrangement or the like within the space data 6 registered in the DB 5 of the server 4. For instance, the user may have moved the table 2*a*. In a modification example, the information terminal 1 has a function of considering such change of the arrangement. At the time of the coordinate system pairing including the above adjustment, the information terminal 1 performs processes such as the measurement of the quantity by using the feature point of the arrangement without or with low possibility of the position change or the like based on the space data 6. The arrangement without or with low possibility of the position change is a wall, a ceiling or an object that is fixedly set up at them. The information terminal 1 selects such an arrangement based on the measurement-target position information 6C, and uses it for adjusting the conversion parameter 7. The arrangement without or with low possibility of the position change and an arrangement with high possibility of the position change may be preliminarily distinguished from each other and be described in the space data 6. For instance, mobility/immobility or the like may be set as a value of an attribute or a type of each arrangement.

The space data 6 may include data of an invisible arrangement such as a structure inside a wall or the like. In this case, at the time of construction of the building or maintenance operations, the user can visualize the invisible arrangement inside the space 2 as AR through the information terminal 1, and can efficiently work or others.

When the information terminal 1 is difficult to recognize the conditions inside the space 2 due to fire, earthquake, blackout or the like, the adjustment of the conversion parameter 7 using the feature point or the like inside the space 2 may be not performed.

When the user U1 is difficult to recognize the conditions inside the space 2 due to fire, earthquake, blackout or the like, the user can supplementally use the space data 6 acquired based on the label 3 by the information terminal 1 for confirming an original position of the arrangement or the like. Alternatively, the space data 6 can be supplementally used when the user has freely used the movable object such as a chair, a table or equipment inside the room, and then, needs to return it to a designated position.

The space data 6 can also be used for supporting evacuation at the time of disasters and for supporting activities of a firefighting team at the time of fire or the like. At this time, the firefighting team may, for instance, use the information terminal 1 to acquire the space data 6 related to the space 2 of the building from outside the building or from the label 3 at the entrance of the building and to recognize the position and the shape through the AR. The space data 6 may be registered in the server 4 at a remote location from the building or the server 4 near the building or inside the building. A device storing the space data 6 such as a beacon device may be provided near the label 3. The label 3 itself may include the storing device.

[Modification Example—Conversion Parameter Registration Function]

As a modification example, the conversion parameter 7 for each information terminal 1 of the user U1 may be registered in the server 4 or other devices. For instance, in step S16 of FIG. 9, after generating the conversion parameter 7, the information terminal 1 of the user U1 may register this conversion parameter 7 to the server 4 as that for the information terminal 1 of this user U1. In this case, when the user U1 uses the same space 2 for the second time and thereafter, the user U1 can download the space data 6 and the conversion parameter 7 from the server 4 based on the ID of the label 3, and use them. This method is effective when the information terminal 1 has a reference terminal coordinate system WA, for instance, when the terminal coordinate system WA of the information terminal 1 is always the same.

[Modification Example—Coordinate System Pairing]

In the first embodiment, at the time of the coordinate system pairing, the information terminal 1 uses the designated feature point or feature line inside the label 3 as shown in FIG. 3 as the quantity 802 of the space 2 side (FIG. 8). The present invention is not limited to this. As a modification example, the representation of the specific direction in the space coordinate system W1, the direction capable of being measured inside the real space, may be used as the quantity 802 of the space 2 side. As the specific direction, the vertical downward direction (gravity direction) or the geomagnetic direction may be used.

Figure 14:
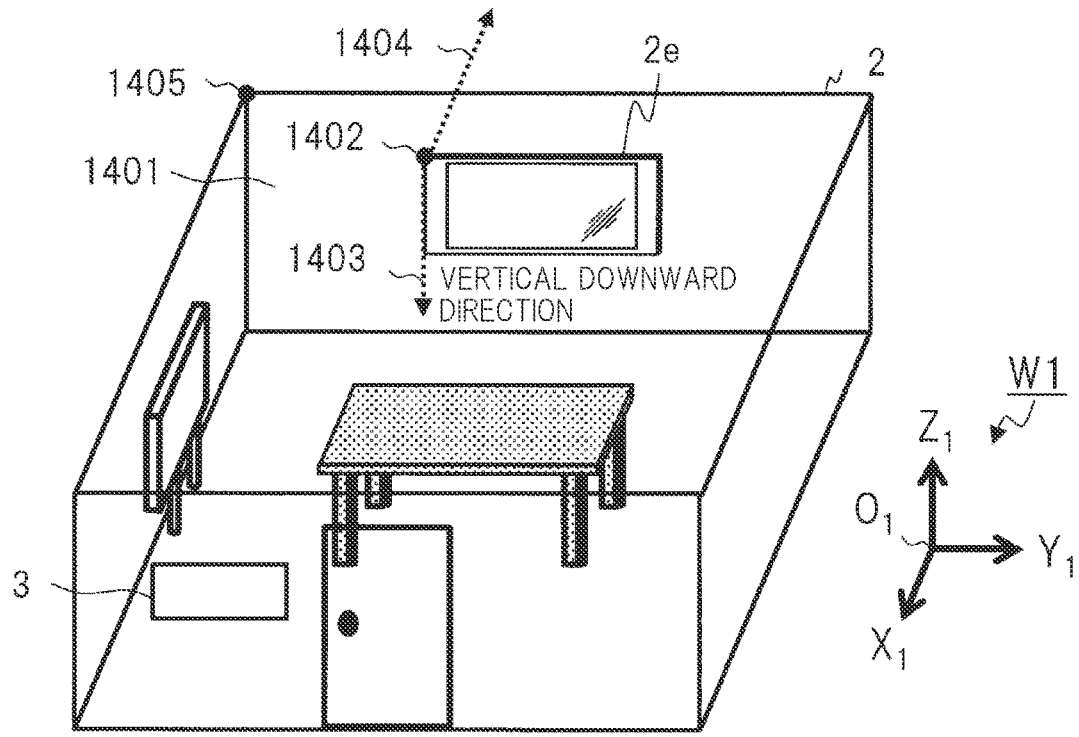
FIG. 14 is a view showing a configuration example of a space in the modification example of the first embodiment.

FIG. 14 shows a configuration example of the space 2 and an example of two specific directions in this modification example. Inside the room, a specific arrangement such as a display device 2e (that may be a screen of a projector or the like) is assumed to be fixedly disposed at a prescribed position of a wall 1401. The display apparatus 2e is defined in the space data 6 (particularly the label data 6B) to be an object functioning as one of the labels 3. For instance, on a display surface of the display device 2e, a point 1402 that is an upper left corner point is set as one feature point representing a position of the display device 2e. The two specific directions that are the vertical downward direction (gravity direction) 1403 and the geomagnetic direction (northward direction) 1404 are defined to start from this point 1402, and are used as the quantity 802. Note that this example shows a case in which the geomagnetic direction 1404 coincides with a negative direction of an axis $X_1$.

As another modification example, a certain specific wall 1401 of the room may be defined to be the arrangement that functions as the label 3, one point of the wall 1401 such as a point 1405 (an intersection of two walls and the ceiling) may be defined to be the feature point, and the two specified specific directions starting from the point 1405 may be used as the quantity 802.

Second Embodiment

A space recognition system of a second embodiment of the present invention or the like will be explained with reference to FIGS. 15 to 20 or the like. Hereinafter, components of the second embodiment or the like that are different from those of the first embodiment will be explained. The second embodiment shows an example in which, for management purposes, the target space for the space recognition is divided into a plurality of regions, each of which is treated as a single space 2 as described above. When the single space 2 is too large, the space data 6 become large, and therefore, process efficiencies, processing speeds or the like may be expected to be worsened. Therefore, in the second embodiment, the space data 6 is set to treat the single space 2 as a region having a suitable size. Accordingly, process efficiencies or the like can be improved, and this manner is effective.

[Divided Region (1)]

Figure 15:
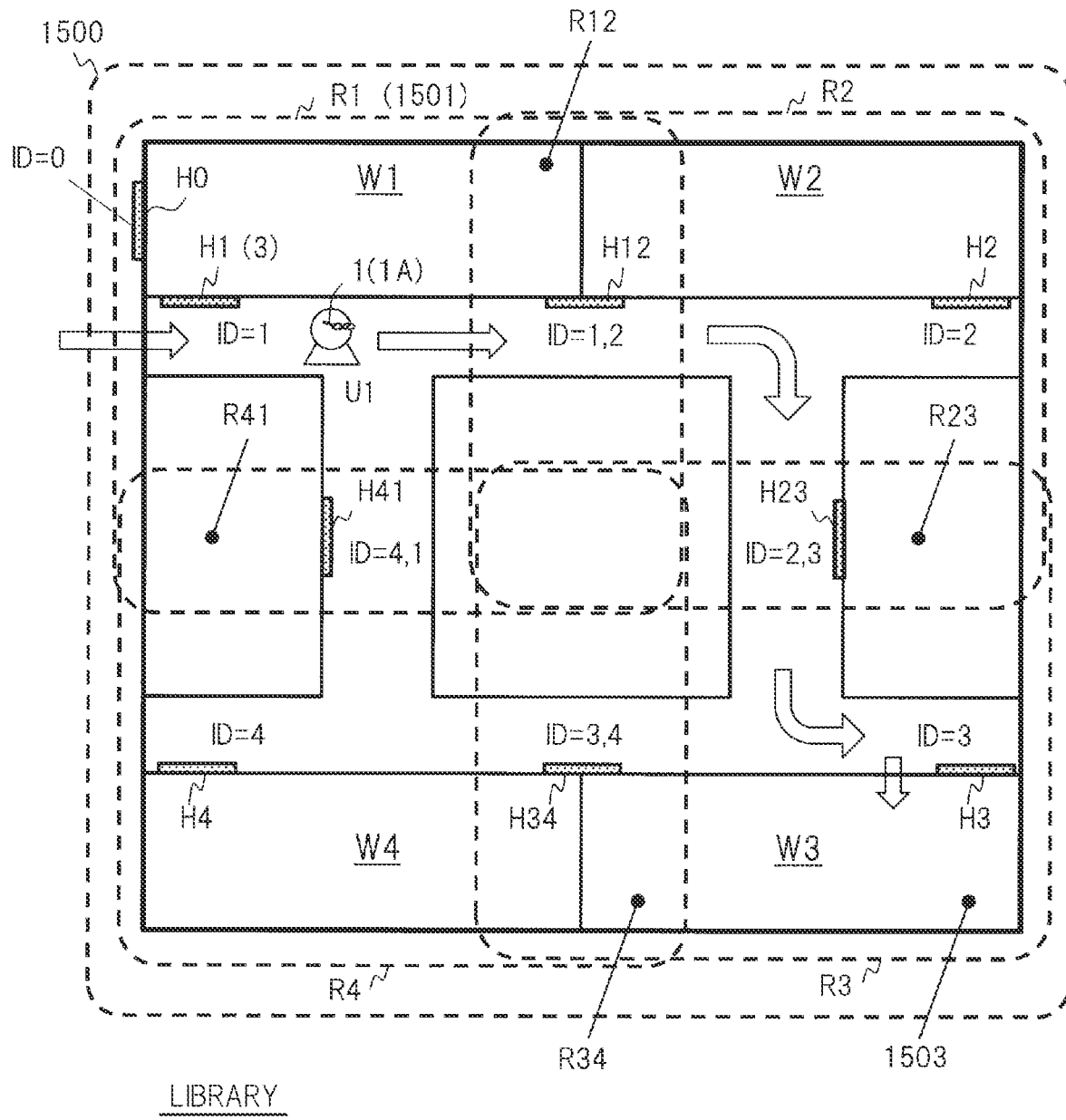
FIG. 15 is a view showing a configuration of a space in a space recognition system and method of a second embodiment of the present invention.

FIG. 15 shows an example of dividing the space into the plurality of regions. FIG. 15 is a schematic view of a planar configuration in which a space 1500 of a building is seen in a bird's-eye view. The space 1500 has a plurality of rooms, areas and passages. The space 1500 is divided into a plurality of regions 1501 such as four regions R1 to R4. Each region 1501 is a three-dimensional region, and corresponds to the single space 2 in the first embodiment. The ID is given to each region 1501. While one region 1501 does not correspond to a single room or the like in this example, one region 1501 may be set to correspond to the single room or the like. In this example, one floor is divided into four regions 1501 (R1 to R4) corresponding to four areas that are of substantially identical size. Since there is an arrangement that extends across the boundary, one region 1501 and an adjoining another region 1501 may partially overlap each other. For instance, a part of region R12 overlaps between the region R1 and the region R2.

The space data 6 for each region 1501 (such as DR1, DR2, DR3, DR4) are preliminarily registered as the library in the DB 5 of the server 4 of FIG. 1. Further, at least one label 3 is preliminarily provided for each region 1501. The ID of the region 1501 is described on each label 3. In this example, a label H0 is set up near an entrance or the like in the space 1500 of the entire building. The ID of the label H0 is assumed to be 0. In the region R1, a label H1, a label H12 and a label H41 are set up. In the region R2, a label H2, a label H23 and a label H12 are set up. In the region R3, a label H3, a label H34 and a label H23 are set up. In the region R4, a label H4, a label H41 and a label H34 are set up. The label H1 has ID=1, the label H2 has ID=2, the label H3 has ID=3 and the label H4 has ID=4. The label 3 may be set up inside the corresponded region 1501 or near a spot through which the region 1501 is accessible.

One label 3 may be used for identifying the plurality of corresponded regions 1501 near thereof. For instance, the label H12 that is set up in the overlapping region R12 has two ID that are ID=1, 2. That is, the label H12 is a label related to two regions that are the region R1 and the region R2. The same applies to the label H23 or the like.

By setting the plurality of labels 3 inside the space 1500, the information terminal 1 can perform the coordinate system pairing including the adjustment at the places of the respective labels 3 in the same manner as described above. The information such as the positions of the labels 3 or the like inside the space 1500 is described in the label data 6B of the corresponding space data 6. A position and a shape of the region 1501 are described in the space coordinate system W1 in the corresponding space shape data 6A. Each region 1501 may be described in the same space coordinate system such as a local coordinate system for this building. The present invention is not limited to this. As shown in FIG. 15, a different space coordinate system (W1 to W4) may be set for each region 1501 (R1 to R4). For instance, when a region 1501 used by the information terminal 1 and an origin of a space coordinate system describing this region 1501 are significantly separated from each other, the coordinate value handled by the information terminal 1 is a large value which may cause calculation errors. Setting a position of an origin of a space coordinate system describing a region 1501 to be inside or near this region 1501 has an advantage of reducing the calculation errors.

FIG. 16 shows a configuration example of the conversion parameter 7 in a case of usage of the space 1500 of FIG. 15 by the information terminal 1 of the user U1. As items, the table of the conversion parameter 7 of FIG. 16 includes the space coordinate system, the terminal coordinate system, the rotation and the origin representation. For the item "space coordinate system", the identification information of a space coordinate system is stored, and corresponds to the ID of the label 3 of the region 1501 in FIG. 15. For the item "terminal coordinate system", the identification information of the terminal coordinate system that is to be paired to the space coordinate system is stored. For the item "rotation", the parameter representing the rotating operation described above is stored. For the item "origin representation", the parameter of the difference in the origin described above is stored. For example, in the first row, the conversion (parameters: $q_{41}$, $o_{1A}$) between the space coordinate system W1 of the region R1 and the terminal coordinate system WA of the information terminal 1 is defined. In the second row, the conversion (parameters: $q_{42}$, $o_{2A}$) between the space coordinate system W2 of the region R2 and the terminal coordinate system WA of the information terminal 1 is defined.

For instance, a concrete example of the usage of the space 1500 by the information terminal 1 of the user U1 having the terminal coordinate system WA is described below. Along with the movement of the user U1, the information terminal 1 moves from a place of the label H0 at the entrance of the building through the label H1 in the region R1, the label H12 in the region R12 and the label H23 in the region R23 to a place of the label H3 in the region R3, and enters a room 1503 as a place of destination inside the region R3. At the place of the label H0, the information terminal 1 may recognize the entire space 1500 of the building as will be described later. The information terminal 1 first acquires ID=1 at the place of the label H1, acquires space data DR1 of the region R1, and performs the coordinate system pairing related to the region R1. Accordingly, the terminal coordinate system WA is adapted to the space coordinate system W1 of the region R1. Next, the information terminal 1 acquires ID=1, 2 from the label H12 at the place of the label H12, acquires space data DR2 from ID=2 which had not been acquired yet, and performs the coordinate system pairing related to the region R2. Next, the information terminal 1 acquires ID=2, 3 at the place of the label H23, acquires space data DR3 from ID=3 which had not been acquired yet, and performs the coordinate system pairing related to the region R3. Next, the information terminal 1 acquires ID=3 at the place of the label H3, and can omit the coordinate system pairing related to the region R3 since this ID has already been acquired. Alternatively, the information terminal 1 may perform a second coordinate system pairing related to the region R3 for the adjustment. Then, the information terminal 1 of the user U1 can suitably display the AR image using the space data DR3 inside the room 1503. Even in the middle of the above-described route, the information terminal 1 of the user U1 can also perform the AR display for route guidance or the like as described later while using the space data 6 of each region.

[Divided Region (2)]

In the second embodiment, the terminal coordinate system to be adapted for the coordinate system pairing can be also made different for each region 1501 inside the space 1500. Making the difference may mean that the information terminal 1 of the same user U1 resets a suitable terminal coordinate system in accordance with the region 1501 or properly separately uses a different terminal coordinate system in accordance with the region 1501. Alternatively, respective terminal coordinate systems of a plurality of information terminals 1 of a plurality of users can be also assigned to the respective regions 1501.

FIG. 17 shows a configuration example of the conversion parameter 7 in the above case. For example, in the first row, conversion (parameters: $q_{41}$, $o_{1A}$) for the region R1 corresponding to ID=1 of the label H1 is defined so that a terminal coordinate system WA is adopted to the space coordinate system W1. In the second row, conversion (parameters: $q_{B2}$, $o_{2B}$) for the region R2 corresponding to ID=2 of the label H2 is defined so that another terminal coordinate system WB is adopted to the space coordinate system W2.

[Divided Region (3)]

For smoothly using the space data 6 in the adjoining region 1501 to the space 1500 as shown in FIG. 15, the information terminal 1 may generate and hold the conversion parameter 7 that allows the coordinate conversion between the adjoining regions 1501. For instance, for the region R12 where the region R1 and the region R2 overlap, the conversion parameter for the conversion between the space coordinate system W1 of the region R1 and the space coordinate system W2 of the region R2 is used.

FIG. 18 shows a configuration example of the conversion parameter 7 in such a case. This table of the conversion parameter 7 includes an item "adjoining space coordinate system". For the item "adjoining space coordinate system", the identification information of two space coordinate systems of two adjoining regions 1501 is stored. For instance, in the first row, ID=1 corresponding to the space coordinate system W1 of the region R1 and ID=2 corresponding to the space coordinate system W2 of the region R2 are set. The items "rotation" and "origin representation" are parameters for defining the conversion between these two space coordinate systems. This conversion between the space coordinate systems is preliminarily known, and therefore, can be described in the space data 6. Information in the space data 6 can be used for the conversion parameter 7. For instance, in the first row, a parameter ($q_{21}$) represents rotation between the space coordinate system W1 and the space coordinate system W2 while a parameter ($o_{12}$) represents a difference between an origin $O_1$ of the space coordinate system W1 and an origin $O_2$ of the space coordinate system W2. By using the conversion parameter 7 as shown in FIG. 18, the information terminal 1 can more rapidly achieve switching of the space coordinate system among the regions 1501.

[Divided Region (4)]

As another modification example, FIG. 19 shows a configuration example of the conversion parameter 7 related to the conversion between the respective terminal coordinate systems used in the adjoining regions 1501. The table of the conversion parameter 7 includes an item "adjoining terminal coordinate system". For the item "adjoining terminal coordinate system", the identification information of two terminal coordinate systems used in two adjoining regions 1501 is stored. For instance, the information terminal 1 of user U1 uses the terminal coordinate system WA in the region R1, and uses another terminal coordinate system WB in the adjoining region R2. In this case, for instance, at a place of the label H12 of the region R12, the information terminal 1 generates and sets a conversion parameter ($q_{BA}$, $o_{AB}$) between the terminal coordinate system WA and the terminal coordinate system WB as shown in the first row at a timing of defining a new terminal coordinate system WB to be used next. By using the conversion parameter 7 as shown in FIG. 19, the information terminal 1 can more rapidly achieve switching of the terminal coordinate system among the regions 1501.

[Divided Region (5)]

As shown in FIG. 15, when entering a building from outside of the space 1500 of the building, the information terminal 1 of the user U1 may generate the conversion parameter 7 for conversion from an external coordinate system to an in-building coordinate system while using the label H0 or the label H1 of the first region R1. The external coordinate system may be a coordinate system using, for instance, latitude, longitude and altitude (such as a coordinate system that can be positioned by the GPS receiver 144 of FIG. 7) that is common globally or regionally or the like. The in-building coordinate system is, for example, the space coordinate systems of the regions R1 to R4. Opposingly, when the information terminal 1 of the user U1 moves out of the space 1500 of the building, a conversion parameter 7 for reverse conversion may be generated. Accordingly, by the conversion, the position recognition of the information terminal 1 can be continued not only inside the building but also between the external coordinate system and the in-building coordinate system.

A plurality of space data 6 related to a plurality of regions 1501 inside the building may be collectively acquired from a specific label 3 such as the label H0 set up at the entrance of the building or the like. The label H0 may be set up inside the building. Alternatively, information of positions or the like related to a plurality of labels 3 (such as H1 to H4) inside the building may be collectively acquired from a specific label 3 such as the label H0. The information terminal 1 may display information (such as a plurality of IDs) of a plurality of regions 1501 recognized from the label H0 to the user U1 by using the AR function, and then, may select a desired region 1501 (such as the ID) in accordance with operations of the user U1. In this case, the information terminal 1 acquires the space data 6 of the selected region 1501.

The information terminal 1 can recognize the label 3 inside the space 1500 and the route between the regions 1501, based on the information acquire from the label 3. The route can be described as relations of the plurality of regions 1501 or the plurality of labels 3. The information terminal 1 can also guide the user U1 in the route while using the AR function as the display of the virtual image 22 (such as an arrow image). For example, a route that is necessary when the user U1 wants to go from the entrance to a room 1503 of the region R3 that is a desired target place as shown in FIG. 15 is a route that passes the labels H1, H12, H23 and H3 in this order. For instance, the user U1 designates a target position (such as the region R3) to the information terminal 1, and the information terminal 1 guides the user U1 in a direction to the label 3 to be passed through next on the route while using the AR image based on the present position. The user U1 can sequentially trace along the labels 3 in accordance with the guidance to get to the target position. By the adjustment of the conversion parameter through the coordinate system pairing at the label 3 in the middle of the route, the information terminal 1 can suitably correct the error of its own position on the route. The space data 6 that can be acquired from the label 3 may include route information or map information, and the information terminal 1 may guide the user while using the information.

Such a function is applicable not only indoors but also outdoors in a similar manner. For instance, the label 3 is set up in a public space or the like. The label 3 functions as a guidepost using the space data 6. The information terminal 1 can recognize the label 3, acquire the space data 6, and guide the user to a specified destination or a target position designated by the user starting from the position of those label 3 while showing the route through the AR.

[Divided Region (6)]

Figure 20:
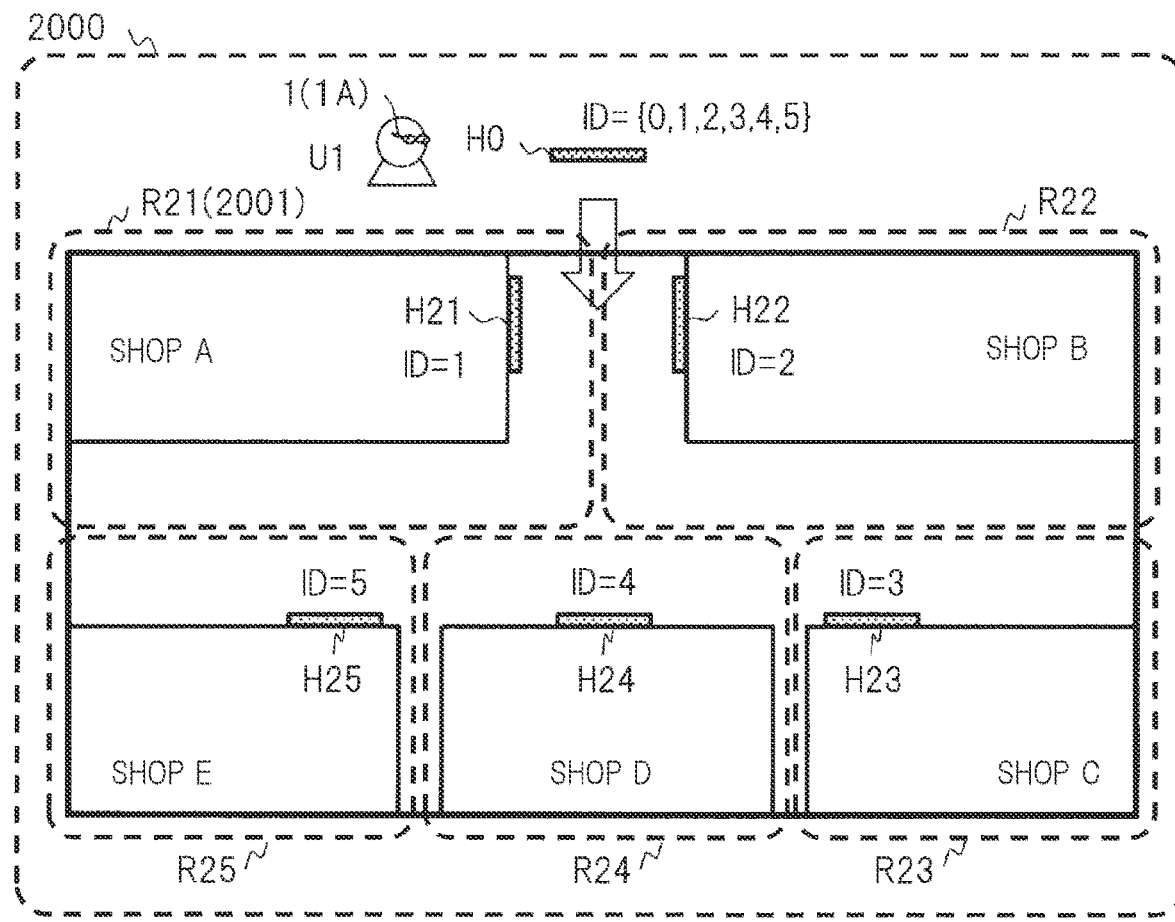
FIG. 20 is a view showing a configuration example of a space in a modification example of the second embodiment.

FIG. 20 shows another configuration example related to the space division. In this example, a plurality of regions 2001 in a global space 2000 corresponding to a building such as a shopping mall are set as, for instance, regions 2001 (such as R21, R22, . . . , R25) for each shop tenant. For instance, the region R21 is a region for a shop A, and the region R22 is a region for a shop B. In the space data 6 (particularly the space shape data 6A), a size and a shape of each region 2001 are flexibly set in detail in accordance with convenience of the shop tenant or the like. In this example, no overlapping region is provided between the regions 2001. In this example, the label H0 is set up on a signboard or the like near an entrance of the space 2000. The information terminal 1 (such as the HMD 1A) of the user U1 can acquire the space data 6 including the map and the route guidance for the global space 2000 of the building from this label H0. The space data 6 may include respective space data 6 of the plurality of regions 2001, and alternatively, the user U1 may be allowed to select and acquire the space data 6 of a part of the regions 2001. The label 3 (such as H21, H22, . . . , H25) is set up in each of the regions 2001 (R21 to R25) having the respective corresponding IDs (such as 1, 2, . . . , 5) corresponding to the space data 6 (such as DR21, DR22, . . . , DR25).

Even in such a space configuration, the information terminal 1 can similarly acquire the space data 6 of each shop from the label 3 of the desired region 2001 of the user U1, and can display the AR or the like that is unique to each shop inside each shop while using the space data 6. The space data 6 for each region 2001 may also include shop information (such as information introducing the shop or a product) or may be correlated with other shop information data. In this case, the information terminal 1 can suitably display the acquired shop information through the AR. As another configuration example, the region 2001 may be set for each passage outside of the shop.

Another Embodiment

The followings are also possible as another embodiment.
[Modification Example—Route Guidance]

Figure 21:
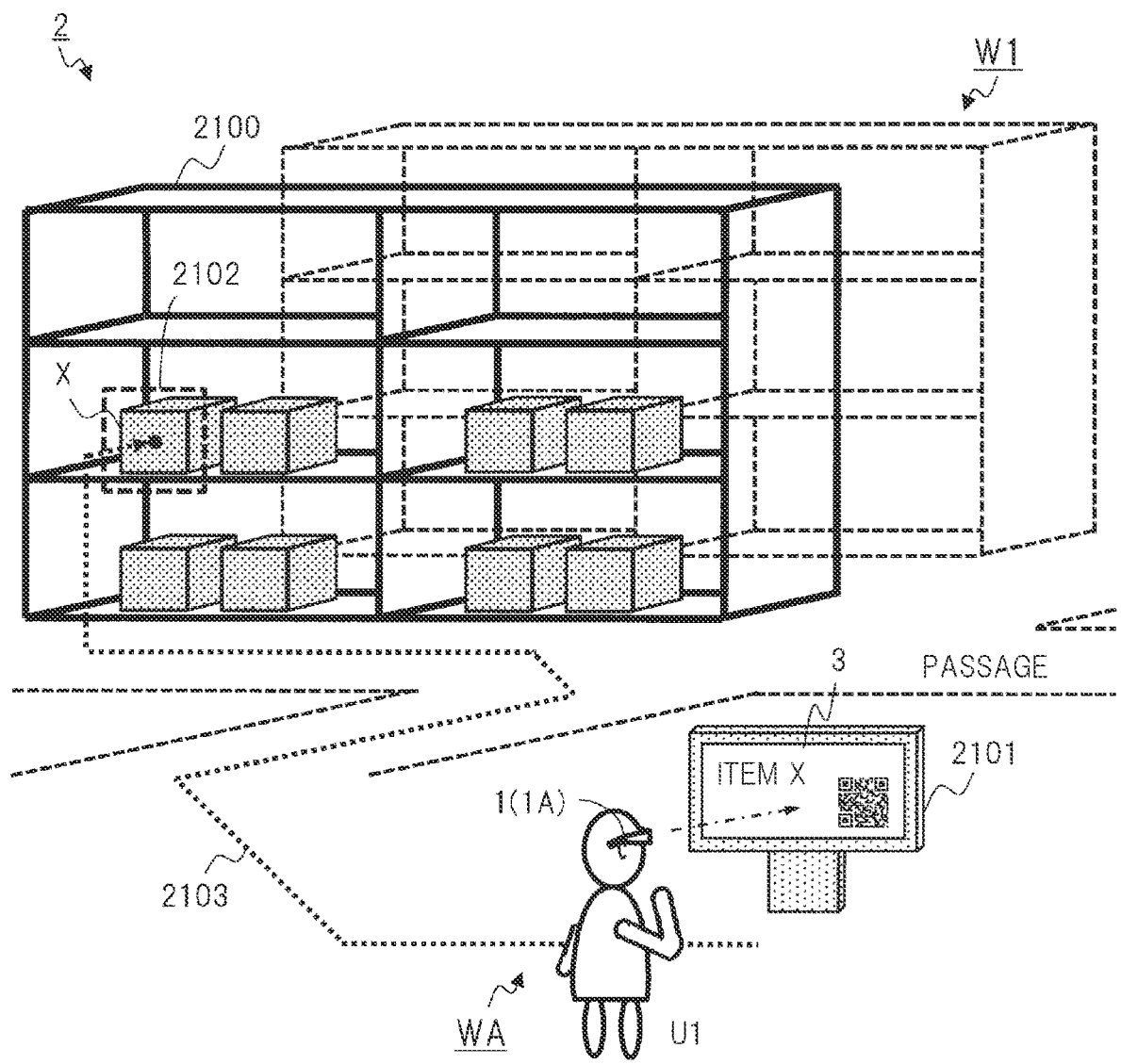
FIG. 21 is a view showing a configuration example of a space in a modification example of the first and second embodiments.

As a modification example, FIG. 21 shows a configuration example of the space 2 in a case of usage inside, for instance, a shop. Inside the space 2 of the shop, a plurality of products are sold. The space 2 is divided by a floor, an area, a passage, a shelf 2100 or the like, and positions of the respective products are managed to correspond thereto. An arrangement 2101 such as a signboard or a display device is at a prescribed position inside the space 2, and the label 3 is configured at the arrangement 2101. The label 3 may also be in a form displayed as an image on a display screen of the display device. In that case, a content of the label 3 can be easily changed. Information or a code image of a product X is described as, for instance, an advertisement in the label 3. The user U1 who is a purchaser of the product recognizes the label 3 through the information terminal 1. The information terminal 1 acquires the space data 6, and performs the coordinate system pairing with respect to the space coordinate system W1 of the shop. Information of a position of the label 3 in the space coordinate system W1, a position of the target product X, a route 2103 from the label 3 to the product X or others is described in the space data 6.

The information terminal 1 can provide guidance about where inside the shop the product X is positioned, such as about which position of which shelf 2100 or the like the product X is positioned at, and can guide the user to the position of the target product X along a route 2103 while using the space data 6 through the AR function. The information terminal 1 displays, for instance, an image that corresponds to the route 2103, an image 2102 representing the position of the product X or the like. Such a function is not limited to the specific product X, and is optionally configurable. For instance, a configuration in which the user U1 performs operations of selecting the target product on the display surface 11 of the information terminal 1 or on the display screen of the display device configuring the label 3 for the guidance about the selected product is also applicable. Such a configuration is also effective for stock management by a shop clerk or the like.

[Modification Example—Authorization]

As a modification example, an authorization for acquiring the space data 6 may be set. For instance, the information terminal 1 acquires the ID when recognizing the label 3, and sends a request together with the ID to the server 4. In response to this request, the server 4 sends a request of certification information for confirming the authorization of acquisition to the information terminal 1. In response to this request, the information terminal 1 sends the certification information such as a user ID (or terminal ID), a password or the like to the server 4. Based on the certification using the certification information received from the information terminal 1, the server 4 confirms that the user and information terminal are allowed to acquire the target space data 6, that is, that they have the authorization of acquisition. The server 4 sends the target space data 6 to the information terminal 1 as a response if having confirmed the authorization, or does not send it if being not able to confirm that.

In a concrete example related to the above authorization control, a user performing maintenance management of the building is set as a specific user together with the certification information and the authorization of acquisition. This user is provided with the space data 6 including data for the maintenance management of the building. The data for the maintenance management includes, for instance, data of structures inside walls. A general user without the authorization cannot acquire the data for the maintenance management. As another concrete example, a shop clerk of a shop is set as the specific user. The space data 6 including backyard data inside the shop, data for stock management or the like is provided to the information terminal 1 of this user.

As for the above authorization, ranks may be set as a plurality of types of authorizations. A scope of the contents of the acquirable space data 6 can be made different for each of the ranks.

[Modification Example—Terminal Control Information]

As another modification example, the information terminal 1 automatically acquires, based on the recognition of the label 3, not only the above-described ID but also specific control information (in other words, terminal control information), and automatically executes control in accordance with the control information. As the terminal control information, for instance, application-program startup control information and file designation information can be exemplified. For instance, an image resulted from coding of such control information is described in the label 3. The information terminal 1 acquires the ID and the control information resulted from decoding of this image of the label 3. The information terminal 1 starts the designated application in accordance with the control information, and automatically opens a designated file. The information terminal 1 displays information regarding the application and the file on the display surface 11. As examples of the application, those related to the AR function are exemplified.

Alternatively, the terminal control information may be described in the space data 6. In this case, the information terminal 1 similarly executes the control in accordance with the terminal control information, for instance, included in or attached to the space data 6 acquired from the server 4.

[Modification Example—Space Coordinate System Fixed to Object]

Figure 22:
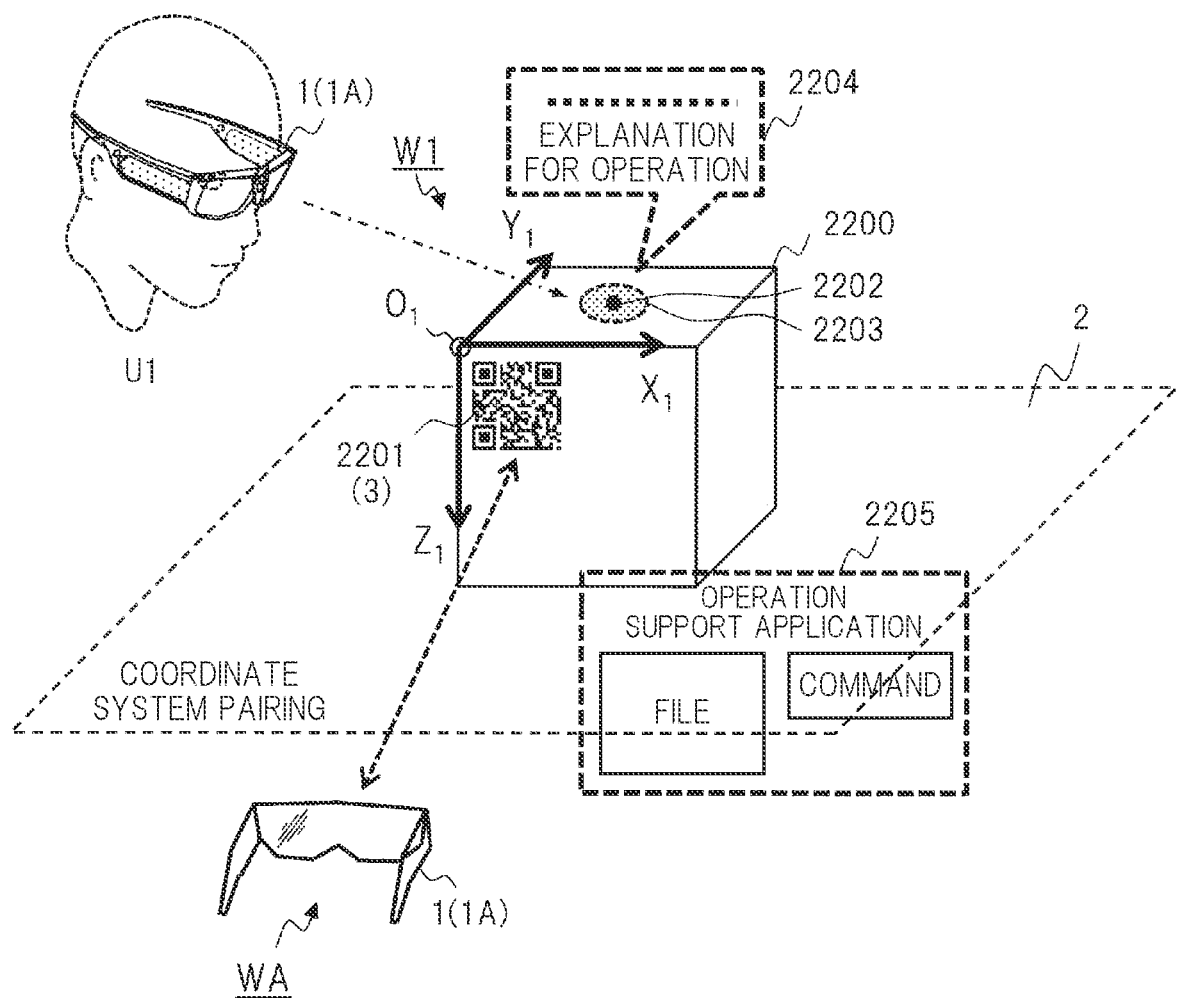
FIG. 22 is a view showing a configuration example of a label in a modification example of the first and second embodiments.

FIG. 22 shows a configuration example of a label 3 according to another modification example. The label 3 may be set to an object 2200 disposed inside the space 2. In the example of FIG. 22, an operation object for a prescribed operation exists as the object 2200 inside the space 2 (only a floor is schematically shown). The user U1 is assumed to be a person performing this operation. The object 2200 may particularly be a movable object to be moved by the user U1. That is, a position of the object 2200 or the like inside the space 2 (the corresponding space coordinate system W1) may change.

The label 3 and the corresponding space coordinate system W1 are fixed at the object 2200. In this example, the label 3 is described as a code image 2201 at a spot on a surface of the object 2200. The space data 6 related to the object 2200 is correspondingly set to the ID of this label 3, and the information terminal 1 can acquire the space data 6 from this label 3. The space data 6 is data in which the object 2200 and the label 3 are described by the space coordinate system W1.

The space coordinate system W1 describing the space data 6 is a space coordinate system describing a relative position or the like with respect to the label 3 and the object 2200. The space coordinate system W1 and the object 2200 have a prescribed positional relation. For instance, an origin $O_1$ in the space coordinate system W1 is set at a prescribed position related to the object 2200, such as an illustrated upper left point belonging to the object 2200. The position of the origin $O_1$ is set to be a position almost identical to a feature point (such as the upper left point) of the label 3. In this example, the position of the label 3 and the position of the origin Olin the space coordinate system W1 are almost identical to each other. However, the position of the origin $O_1$ in the space coordinate system W1 is not limited. The origin $O_1$ may be at a position remote from the label 3 and the object 2200 by a prescribed relation.

In addition to a shape of the object 2200, the space data 6 may include information related to operations performed for the object 2200, operation explanation information or the like. The information related to the operations may, for instance, be information of an operation target point 2202 (such as a central point on an upper surface of the object 2200) or the like. The operation explanation information may, for instance, be operation explanation display position information for displaying the operation explanation as an AR virtual image (such as an AR panel) or the like. An image 2203 is illustrated as an AR image example for notifying the user U1 of the operation target point 2202 while emphasizing it. An image 2204 is illustrated as an example of the AR panel (such as an image like a bubble) of the operation explanation for the operation target point 2202. The image 2204 or the like is an image in which, for instance, a background real image is displayed to be semi-transparent.

As described above, from the label 3, the startup control information of the operation support application related to the operation, the designation information of a target operation file to be used for this application or the like can be acquired as the terminal control information. Based on the recognition of this label 3, the information terminal 1 (HMD 1A) automatically starts the application, opens the target operation file, and superimposes and displays such a virtual image thereof on the display surface 11. An image 2205 is schematically illustrated as a display example of the AR panel of such an application. The user U1 can perform input operations (such as command designation) with respect to the image 2205.

Based on settings for the space data 6, the directions of three axes of the space coordinate system W1 or the like can be displayed as an image for supporting operations. The operation support application displays the AR image at the designated position in accordance with an operation of designating a desired position (such as recognition of a fingertip or the like) in the space coordinate system W1 by the user U1.

Through the above-described operation support using the space data 6 and the AR, the user U1 can rapidly set preparation for the operations in front of the object 2200 which is the operation target, and can effectively perform the operations while referring to the operation explanation based on the AR image or the like. When the object 2200 is moved in this modification example, the label 3 also moves in accordance with the movement. However, a relative positional relation of the space coordinate system W1 to the object 2200 and the label 3 is maintained. When the object is moved, the information terminal 1 adjusts the conversion parameter between the terminal coordinate system WA and the space coordinate system W1. At the time of the adjustment, the conversion parameter may be adjusted while a partial region of the object 2200, the feature point or feature line of which can be specified as the space data, is regarded to be the label 3. As a result, even when the object 2200 is moved, the information terminal 1 can suitably display the AR matching the space coordinate system W1 of the object 2200.

In the foregoing, the present invention has been concretely described on the basis of the embodiments. However, the present invention is not limited to the foregoing embodiments, and various modifications can be made within the scope of the present invention. Addition, elimination, replacement and various combination of the elements of the embodiments are applicable. The above-described function or the like may be partially or entirely achieved by a hardware or a software program process. A program or data configuring the function or the like may be stored in a readable storage medium on a computer or an apparatus on a communication network.

EXPLANATION OF REFERENCE SIGNS

1 . . . information terminal, 1A . . . HMD, 1B . . . smartphone, 2 . . . space, 3 . . . label, 4 . . . server, 5 . . . DB, 6 . . . space data, 11 . . . display surface, 12 . . . camera, 13 . . . ranging sensor, 21 . . . position, 22 . . . virtual image, 23 . . . access point, WA . . . terminal coordinate system, W1 . . . space coordinate system

The invention claimed is:

1. A space recognition system comprising:
an information terminal of a user having a function of displaying an image on a display surface and having a terminal coordinate system; and
a label which is provided to correspond to a space and in which information for identifying the space is described,
wherein, when recognizing the space,
the information terminal
specifies space data in which the space and the label are described in a space coordinate system by using the information read from recognition of the label,
measures relations in a position and a direction between the information terminal and the label by using the space data, and
adapts the terminal coordinate system to the space coordinate system, based on data representing the measured relations,
wherein the space data includes information of a position of one feature point of the label in the space coordinate system and information of two different specific directions, and
wherein the information terminal measures two different specific directions in the terminal coordinate system, its own position, and a vector heading from its own position to a position of the feature point of the label.

2. The space recognition system according to claim 1,
wherein the information terminal sets a conversion parameter for adapting the terminal coordinate system to the space coordinate system.

3. The space recognition system according to claim 2,
wherein the information terminal displays a virtual image on the display surface by using the conversion parameter to match a position inside the space.

4. The space recognition system according to claim 1,
wherein the information terminal measures quantity representing a relative directional relation between the terminal coordinate system and the space coordinate system and quantity representing a relative positional relation between an origin of the terminal coordinate system and an origin of the space coordinate system.

5. The space recognition system according to claim 1,
wherein the label is set up on an outer surface of a boundary of the space.

6. The space recognition system according to claim 1,
wherein the label is set up as a plurality of labels inside the space, and
the information terminal can recognize the space between itself and each label of the plurality of labels.

7. The space recognition system according to claim 1,
wherein an image resulted from coding of information is described in the label, and
the information terminal recognizes the image of the label by using a camera, and acquires the information by decoding the image.

8. The space recognition system according to claim 1,
wherein the label is set on a floor, a wall or a ceiling configuring the space.

9. The space recognition system according to claim 1,
wherein the label is displayed on a display surface of a display device set in the space.

10. The space recognition system according to claim 1,
wherein the space data is registered as an external source in a server.

11. The space recognition system according to claim 1,
wherein the information terminal displays a virtual image on the display surface for guidance for the user when recognizing the label.

12. The space recognition system according to claim 1,
wherein the space is divided into a plurality of regions, and
the space data includes a plurality of pieces of space data corresponding to the plurality of regions.

13. The space recognition system according to claim 1,
wherein the information terminal performs route guidance from a position of the label inside the space or a current position of the information terminal to a position of a prescribed object or a position designated by the user by displaying a virtual image on the display surface.

14. The space recognition system according to claim 1,
wherein the label is fixed to and set up at a prescribed object inside the space, and the space coordinate system is fixed to and set up at the label and the object.

15. A space recognition method in a space recognition system including:
an information terminal of a user having a function of displaying an image on a display surface and having a terminal coordinate system; and
a label which is provided to correspond to a space and in which information for identifying the space is described,
the space recognition method comprising the steps of, when the information terminal recognizes the space:
specifying space data in which the space and the label are described in a space coordinate system by using the information read from recognition of the label,
measuring relations in a position and a direction between the information terminal and the label by using the space data, and
adapting the terminal coordinate system to the space coordinate system, based on data representing the measured relations,
wherein the space data includes information of a position of one feature point of the label in the space coordinate system and information of two different specific directions, and
wherein the information terminal measures two different specific directions in the terminal coordinate system, its own position, and a vector heading from its own position to a position of the feature point of the label.

16. The space recognition method according to claim 15, wherein the information terminal sets a conversion parameter for adapting the terminal coordinate system to the space coordinate system.

17. The space recognition method according to claim 16, wherein the information terminal displays a virtual image on the display surface by using the conversion parameter to match a position inside the space.

18. The space recognition method according to claim 15, wherein the information terminal measures quantity representing a relative directional relation between the terminal coordinate system and the space coordinate system and quantity representing a relative positional relation between an origin of the terminal coordinate system and an origin of the space coordinate system.

19. The space recognition method according to claim 15, wherein the label is set up on an outer surface of a boundary of the space.

20. The space recognition method according to claim 15, wherein the label is set up as a plurality of labels inside the space, and
the information terminal can recognize the space between itself and each label of the plurality of labels.

21. The space recognition method according to claim 15, wherein an image resulted from coding of information is described in the label, and
the information terminal recognizes the image of the label by using a camera, and acquires the information by decoding the image.

22. The space recognition method according to claim 15, wherein the label is set on a floor, a wall or a ceiling configuring the space.

23. The space recognition method according to claim 15, wherein the label is displayed on a display surface of a display device set in the space.

24. The space recognition method according to claim 15, wherein the space data is registered as an external source in a server.

25. The space recognition method according to claim 15, wherein the information terminal displays a virtual image on the display surface for guidance for the user when recognizing the label.

26. The space recognition method according to claim 15, wherein the space is divided into a plurality of regions, and
the space data includes a plurality of pieces of space data corresponding to the plurality of regions.

27. The space recognition method according to claim 15, wherein the information terminal performs route guidance from a position of the label inside the space or a current position of the information terminal to a position of a prescribed object or a position designated by the user by displaying a virtual image on the display surface.

28. The space recognition method according to claim 15, wherein the label is fixed to and set up at a prescribed object inside the space, and
the space coordinate system is fixed to and set up at the label and the object.

29. An information terminal in a space recognition system including:
the information terminal of a user having a function of displaying an image on a display surface and having a terminal coordinate system; and
a label which is provided to correspond to a space and in which information for identifying the space is described,
wherein, when recognizes the space,
the information terminal
specifies space data in which the space and the label are described in a space coordinate system by using the information read from recognition of the label,
measures relations in a position and a direction between the information terminal and the label by using the space data, and
adapts the terminal coordinate system to the space coordinate system, based on data representing the measured relations,
wherein the space data includes information of a position of one feature point of the label in the space coordinate system and information of two different specific directions, and
wherein the information terminal measures two different specific directions in the terminal coordinate system, its own position, and a vector heading from its own position to a position of the feature point of the label.

30. The information terminal according to claim 29, wherein the information terminal sets a conversion parameter for adapting the terminal coordinate system to the space coordinate system.

31. The information terminal according to claim 30, wherein the information terminal displays a virtual image on the display surface by using the conversion parameter to match a position inside the space.

32. The information terminal according to claim 29, wherein the information terminal measures quantity representing a relative directional relation between the terminal coordinate system and the space coordinate system and quantity representing a relative positional relation between an origin of the terminal coordinate system and an origin of the space coordinate system.

33. The information terminal according to claim 29, wherein the label is set up on an outer surface of a boundary of the space.

34. The information terminal according to claim 29,
wherein the label is set up as a plurality of labels inside the space, and
the information terminal can recognize the space between itself and each label of the plurality of labels.

35. The information terminal according to claim 29,
wherein an image resulted from coding of information is described in the label, and
the information terminal recognizes the image of the label by using a camera, and acquires the information by decoding the image.

36. The information terminal according to claim 29,
wherein the label is set on a floor, a wall or a ceiling configuring the space.

37. The information terminal according to claim 29,
wherein the label is displayed on a display surface of a display device set in the space.

38. The information terminal according to claim 29,
wherein the space data is registered as an external source in a server.

39. The information terminal according to claim 29,
wherein the information terminal displays a virtual image on the display surface for guidance for the user when recognizing the label.

40. The information terminal according to claim 29,
wherein the space is divided into a plurality of regions, and
the space data includes a plurality of pieces of space data corresponding to the plurality of regions.

41. The information terminal according to claim 29,
wherein the information terminal performs route guidance from a position of the label inside the space or a current position of the information terminal to a position of a prescribed object or a position designated by the user by displaying a virtual image on the display surface.

42. The information terminal according to claim 29,
wherein the label is fixed to and set up at a prescribed object inside the space, and
the space coordinate system is fixed to and set up at the label and the object.

* * * * *